US012726255B2

(12) United States Patent
Rong et al.

(10) Patent No.: US 12,726,255 B2
(45) Date of Patent: Sep. 1, 2026

(54) METHODS AND APPARATUS FOR MULTI-BEAM OPERATION

(71) Applicant: Huawei Technologies Co., Ltd., Shenzhen (CN)

(72) Inventors: Zhigang Rong, San Diego, CA (US); Weimin Xiao, Hoffman Estates, IL (US); Qian Cheng, Naperville, IL (US); Jialing Liu, Palatine, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 462 days.

(21) Appl. No.: 18/189,618

(22) Filed: Mar. 24, 2023

(65) Prior Publication Data

US 2023/0269041 A1 Aug. 24, 2023

Related U.S. Application Data

(63) Continuation of application No. PCT/US2021/071997, filed on Oct. 22, 2021.

(60) Provisional application No. 63/186,598, filed on May 10, 2021, provisional application No. 63/138,258, filed on Jan. 15, 2021, provisional application No. 63/104,258, filed on Oct. 22, 2020.

(51) Int. Cl.

*H04B 7/06* (2006.01)
*H04L 5/00* (2006.01)
*H04W 72/20* (2023.01)

(52) U.S. Cl.

CPC ....... *H04B 7/06968* (2023.05); *H04L 5/0035* (2013.01); *H04L 5/0053* (2013.01); *H04L 5/0091* (2013.01); *H04W 72/20* (2023.01)

(58) Field of Classification Search

None

See application file for complete search history.

(56) References Cited

U.S. PATENT DOCUMENTS

| | | | | |
|---|---|---|---|---|
| 9,031,036 | B2 * | 5/2015 | Kang | H04W 36/0064 370/331 |
| 11,088,901 | B2 * | 8/2021 | Sun | H04W 76/27 |
| 11,153,053 | B2 * | 10/2021 | Chen | H04W 72/23 |
| 12,439,187 | B2 * | 10/2025 | Kurahashi | H04Q 11/0005 |
| 2018/0329961 | A1 * | 11/2018 | Kapoor | G06F 16/116 |
| 2019/0253220 | A1 * | 8/2019 | Kim | H04W 72/046 |
| 2020/0288453 | A1 * | 9/2020 | Zhang | H04W 72/12 |
| 2021/0194765 | A1 * | 6/2021 | Manolakos | H04L 41/0896 |
| 2022/0158805 | A1 * | 5/2022 | Frenne | H04W 72/23 |

(Continued)

OTHER PUBLICATIONS

Moderator (Samsung), "Summary of offline discussion on unified TCI and inter-cell beam management ", 3GPP TSG RAN WG1 #106-e, R1-2106864, Aug. 16-27, 2021, 9 Pages, e-Meeting.

(Continued)

*Primary Examiner* — Phirin Sam

(74) *Attorney, Agent, or Firm* — Slater Matsil, LLP

(57) ABSTRACT

A network controller transmits to a communication device a first control message comprising a first indicator indicating a plurality of target elements, wherein the plurality of target elements instruct the communication device to share a plurality of quasi co-location (QCL) information or a plurality of spatial filter information when receiving and/or transmitting on the plurality of target elements.

17 Claims, 10 Drawing Sheets

(56) References Cited

U.S. PATENT DOCUMENTS

| | | | | |
|---|---|---|---|---|
| 2023/0137907 | A1* | 5/2023 | Fang | H04W 72/232<br>370/329 |
| 2023/0155800 | A1* | 5/2023 | Ghanbarinejad | H04B 7/0628<br>370/329 |
| 2023/0188197 | A1* | 6/2023 | Zhang | H04B 7/0634<br>370/329 |
| 2023/0318663 | A1* | 10/2023 | Cao | H04B 7/0408<br>375/262 |
| 2025/0212238 | A1* | 6/2025 | Park | H04W 72/53 |
| 2025/0254009 | A1* | 8/2025 | Frenne | H04L 5/0069 |
| 2025/0331054 | A1* | 10/2025 | Raghavan | H04L 5/0085 |

OTHER PUBLICATIONS

Vivo, "Discussion on multi-beam enhancement," 3GPP TSG RAN WG1 #102-e, R1-2005363, e-Meeting, Aug. 17-28, 2020, 21 pages.

Samsung, "Multi-beam enhancements," 3GPP TSG WG1 #102-e, R1-2006991, e-Meeting, Aug. 17-28, 2020, 15 pages.

Futurewei, "Enhancement on multi-beam operation," 3GPP TSG RAN WG1 #102-e, R1-2005290, e-Meeting, Aug. 17-28, 2020, 4 pages.

Qualcomm Incorporated, "Multi-TRP Enhancements," 3GPP TSG-RAN WG1 Meeting #102-e, R1-2006781, e-Meeting, Aug. 17-28, 2020, 11 pages.

Futurewei, "Enhancement on multi-beam operation." 3GPP TSG RAN WG1 #102-e" R1-2005290, Aug. 17-28, 2020, 4 pages, e-Meeting.

Vivo, "Discussion on multi-beam enhancement," 3GPP TSG RAN WG1 #102-E, R1-2005363, Aug. 17-18, 2020, 22 pages, e-meeting.

Qualcomm Incorporated, "Multi-TRP Enhancements," 3GPP TSG-RAN WG1 Meeting #102-e, R1-2006781, Aug. 17-28, 2022, 12 pages, e-Meeting.

Samsung, "Multi-beam enhancements," 3GPP TSG RAN WG1 #102-e, R1-2006991, Aug. 17-28, 2020, 16 pages, e-meeting.

Ericsson, "Draft CR on TCI states for Aperiodic CSI-RS," 3GPP TSG-RAN WG1 Meeting #103e, R1-2008635, Oct. 26-Nov. 13, 2020, 1 page, e-Meeting.

Qualcomm Incorporated, "Enhancements on Multi-beam Operation," 3GPP TSG RAN WG1 Meeting #103-e, R1-2009250, Oct. 26-Nov. 13, 2020, 12 pages.

Media Tek Inc., "Enhancement on multi-beam operation," 3GPP TSG RAN WG1 #104-e, R1-2100588, Jan. 25-Feb. 5, 2021, 28 pages, e-Meeting.

Moderator (Samsung), "Moderator summary #3 for multi-beam enhancement: Round 2," 3GPP TSG RAN WG1 #104b-e, R1-2103892, Apr. 12-20, 2021, 22 pages, e-Meeting.

Moderator (Samsung), "Summary of offline discussion on unified TCI and inter-cell beam management," 3GPP TSG RAN WG1 #106-e, R1-2106864, Aug. 16-17, 2021, 10 pages, e-Meeting.

Futurewei, "Enhancement on multi-beam operation," 3GPP TSG RAN WG1 Meeting #106-e, R-2107085, Aug. 16-27, 2021, 14 pages, e-Meeting.

3GPP TSG RAN WG1 Meeting #102-e E-meeting, R1-2005263, Assistance RS occasions for IDLE/inactive mode, Huawei, HiSilicon, Aug. 17-28, 2020, total 5 pages.

* cited by examiner

| CORE SET POOL ID | SERVING CELL ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |
| . . . | | | | | | | | |
| $T_{(N-2)x8+7}$ | $T_{(N-2)x8+6}$ | $T_{(N-2)x8+5}$ | $T_{(N-2)x8+4}$ | $T_{(N-2)x8+3}$ | $T_{(N-2)x8+2}$ | $T_{(N-2)x8+1}$ | $T_{(N-2)x8}$ | Oct N |

395

| CORE SET POOL ID | ADDITIONAL CELL ID | | | | | BWP ID | | |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |
| . . . | | | | | | | | |
| $T_{(N-2)x8+7}$ | $T_{(N-2)x8+6}$ | $T_{(N-2)x8+5}$ | $T_{(N-2)x8+4}$ | $T_{(N-2)x8+3}$ | $T_{(N-2)x8+2}$ | $T_{(N-2)x8+1}$ | $T_{(N-2)x8}$ | Oct N |

Oct 1

METHODS AND APPARATUS FOR MULTI-BEAM OPERATION

CROSS-REFERENCE TO RELATED APPLICATIONS

This application is a continuation of International Patent Application No. PCT/US2021/071997, filed on Oct. 22, 2021, entitled "Methods and Apparatus for Multi-Beam Operation," which claims the benefit of U.S. Provisional Application No. 63/104,258, filed on Oct. 22, 2020, entitled "Methods and Apparatus for Multi-Beam Operation," U.S. Provisional Application No. 63/138,258, filed on Jan. 15, 2021, entitled "Methods and Apparatus for Multi-beam Operation," and U.S. Provisional Application No. 63/186,598, filed on May 10, 2021, entitled "Methods and Apparatus for Multi-Beam Operation," which applications are incorporated herein by reference in their entireties.

TECHNICAL FIELD

The present disclosure relates generally to methods and apparatus for digital communications, and, in particular embodiments, to methods and apparatus for multi-beam operations in wireless communications.

BACKGROUND

One possible deployment scenario for fifth generation (5G) New Radio (NR) system architecture uses high frequency (HF) (6 gigahertz (GHz) and above) operating frequencies to exploit greater available bandwidth, and reduced interference than what is available at lower frequencies. Beamforming is often used to overcome path loss issues associated with the use of higher frequencies. In some deployment scenarios, different channel uses different beam, e.g., downlink control channel transmission between a mobile network and a user equipment (UE) uses a wide beam while downlink data channel transmission uses a narrow beam, resulting in a multi-beam operation scenario. However, in a frequent deployment scenario, a common beam is used for downlink control channel and downlink data channel transmissions. In addition, in some scenarios the uplink control and data may utilize a correspondence beam of the common downlink beam. In yet another frequent deployment scenario, a common beam is used for communications between a UE and a mobile network across multiple component carriers. Beam management procedures are used to update transmission configuration states associated with the uplink/downlink transmissions. Therefore, there is a need for apparatus and methods for more efficient beam management for multi-beam operation situations in which a common beam is used for uplink and/or downlink data and control transmissions, and for situations in which a common beam is used for communications across multiple component carriers.

SUMMARY

In accordance with one aspect of the present disclosure, a method is provided that includes transmitting, by a network controller to a communication device, a first control message comprising a first indicator indicating a plurality of target elements, wherein the plurality of target elements instruct the communication device to share a plurality of quasi co-location (QCL) information or a plurality of spatial filter information when receiving and/or transmitting on the plurality of target elements.

In accordance with another aspect of the present disclosure, a method is provided that includes transmitting, by a network controller to a communication device, a first control message comprising a first indicator indicating a mapping relationship between a plurality of transmission configuration indication (TCI) states and a plurality of TCI codepoints, wherein at least a first TCI state of the plurality of TCI states is for DL communication and at least a second TCI state of the plurality of TCI states is for UL communication and both the first TCI state and the second TCI state are mapped to a first TCI codepoint of the plurality of TCI codepoints; and transmitting, by the network controller to the communication device, a second control message comprising a second indicator indicating the first TCI codepoint, wherein the first TCI codepoint instructs the communication device to use the first TCI state for DL communication and to use the second TCI state for UL communication.

In accordance with another aspect of the present disclosure, a method is provided that includes transmitting, by a network controller to a communication device, a first control message comprising a first indicator indicating a mapping relationship between a plurality of TCI states and a plurality of TCI codepoints, wherein at least a first TCI state and a second TCI state of the plurality of TCI states are for UL communication and both the first TCI state and the second TCI state are mapped to a first TCI codepoint of the plurality of TCI codepoints; and transmitting, by the network controller to the communication device, a second control message comprising a second indicator indicating the first TCI codepoint, wherein the first TCI codepoint instructs the communication device to use the first TCI state and the second TCI state for UL communication.

In accordance with another aspect of the present disclosure, a method is provided that includes receiving, by a communication device from a network controller, a first control message comprising a first indicator indicating a plurality of target elements; and sharing, by the communication device, a plurality of QCL information or a plurality of spatial filter information when receiving and/or transmitting on the plurality of target elements.

In accordance with another aspect of the present disclosure, a method is provided that includes receiving, by a communication device from a network controller, a first control message comprising a first indicator indicating a mapping relationship between a plurality of TCI states and a plurality of TCI codepoints, wherein at least a first TCI state of the plurality of TCI states is for DL communication and at least a second TCI state of the plurality of TCI states is for UL communication and both the first TCI state and the second TCI state are mapped to a first TCI codepoint of the plurality of TCI codepoints; receiving, by the communication device from the network controller, a second control message comprising a second indicator indicating the first TCI codepoint; and performing, by the communication device, DL communication using the first TCI state and/or UL communication using the second TCI state in accordance with the first TCI codepoint.

In accordance with another aspect of the present disclosure, a method is provided that includes receiving, by a communication device from a network controller, a first control message comprising a first indicator indicating a mapping relationship between a plurality of TCI states and a plurality of TCI codepoints, wherein at least a first TCI state and a second TCI state of the plurality of TCI states are for UL communication and both the first TCI state and the second TCI state are mapped to a first TCI codepoint of the plurality of TCI codepoints; receiving, by the communication device from the network controller, a second control message comprising a second indicator indicating the first TCI codepoint; and performing, by the communication device, UL communication using the first TCI state and the second TCI state in accordance with the first TCI codepoint.

In accordance with other aspects of the present disclosure, an apparatus and a system are also provided for implementing the forgoing methods.

Optionally, in any of the preceding aspects, the plurality of target elements comprises a plurality of channels and/or reference signals.

Optionally, in any of the preceding aspects, the plurality of channels and/or reference signals comprises at least one of a dedicated demodulation reference signal (DMRS) of a physical downlink shared channel (PDSCH), a DMRS of a physical downlink control channel (PDCCH), a channel state information reference signal (CSI-RS), a DMRS of a physical uplink shared channel (PUSCH), a DMRS of a physical uplink control channel (PUCCH), or a sounding reference signal (SRS).

Optionally, in any of the preceding aspects, the plurality of channels and/or reference signals comprises at least one of a DMRS of a physical downlink shared channel (PDSCH), a DMRS of a physical downlink control channel (PDCCH), or a channel state information reference signal (CSI-RS), and the plurality of QCL information or the plurality of spatial filter information is shared by the communication device when receiving on the plurality of channels and/or reference signals.

Optionally, in any of the preceding aspects, the plurality of channels and/or reference signals comprises at least one of a DMRS of a physical uplink shared channel (PUSCH), a DMRS of a physical uplink control channel (PUCCH), or a sounding reference signal (SRS), and the plurality of QCL information or the plurality of spatial filter information is shared by the communication device when transmitting on the plurality of channels and/or reference signals.

Optionally, in any of the preceding aspects, the plurality of target elements comprises a plurality of component carriers.

Optionally, in any of the preceding aspects, the plurality of target elements comprises a plurality of communication devices.

Optionally, in any of the preceding aspects, the first control message is a radio resource control (RRC) signaling.

Optionally, in any of the preceding aspects, the first control message is a medium access control (MAC) control element (CE).

Optionally, in any of the preceding aspects, the network controller transmits to the communication device, a second control message comprising a second indicator indicating a plurality of source reference signals, wherein the plurality of source reference signals instruct the communication device to determine the plurality of QCL information or the plurality of spatial filter information in accordance with the plurality of source reference signals.

Optionally, in any of the preceding aspects, the network controller transmits the second control message after transmitting the first control message.

Optionally, in any of the preceding aspects, the second control message is a downlink control information (DCI) message.

Optionally, in any of the preceding aspects, the second control message is a medium access control (MAC) control element (CE).

Optionally, in any of the preceding aspects, the second control message further comprises the first indicator.

Optionally, in any of the preceding aspects, the second indicator comprises a plurality of transmission reception point (TRP) indicators indicating a plurality of TRPs.

Optionally, in any of the preceding aspects, the second indicator comprises a first plurality of transmission configuration indication (TCI) state indicators indicating a first plurality of TCI states, and wherein the first plurality of TCI states comprise a plurality of indicators indicating the plurality of source reference signals.

Optionally, in any of the preceding aspects, the first plurality of TCI states further comprise a plurality of transmission reception point (TRP) indicators indicating a plurality of TRPs.

Optionally, in any of the preceding aspects, the first plurality of TCI states are elements of a first set of TCI states, and wherein the first set of TCI states are for downlink (DL) communication.

Optionally, in any of the preceding aspects, the first plurality of TCI states instruct a user equipment (UE) to determine a plurality of uplink (UL) control parameters for UL communication in accordance with the first plurality of TCI states.

Optionally, in any of the preceding aspects, determining the plurality of UL control parameters comprises: determining a second plurality of TCI states in accordance with the first plurality of TCI states; and determining the plurality of UL control parameters in accordance with the second plurality of TCI states.

Optionally, in any of the preceding aspects, the second plurality of TCI states are elements of a second set of TCI states, and wherein the second set of TCI states are for UL communication.

Optionally, in any of the preceding aspects, the second plurality of TCI states comprise a plurality of indicators indicating the plurality of UL control parameters.

Optionally, in any of the preceding aspects, the communication device receives from the network controller, a second control message comprising a second indicator indicating a plurality of source reference signals; and the communication device determines the plurality of QCL information or the plurality of spatial filter information in accordance with the plurality of source reference signals.

Optionally, in any of the preceding aspects, the communication device receives the second control message after receiving the first control message.

Optionally, in any of the preceding aspects, the communication device determines a plurality of UL control parameters for UL communication in accordance with the first plurality of TCI states.

In the forgoing aspects, a network controller transmits to a communication device, a first control message comprising a first indicator indicating a plurality of target elements, wherein the plurality of target elements instruct the communication device to share a plurality of QCL information or a plurality of spatial filter information when receiving and/or transmitting on the plurality of target elements.

In the forgoing aspects, a user equipment (UE) receives, from a network controller, a first control message comprising a first indicator indicating a plurality of target elements;

and shares a plurality of QCL information or a plurality of spatial filter information when receiving and/or transmitting on the plurality of target elements.

An advantage of the forgoing aspects of the present disclosure is to facilitate more efficient beam management for multiple data and/or control channels on DL and UL, for multiple data and/or control channels across multiple component carriers, and for multiple UEs sharing a common beam. The forgoing aspects of the present disclosure enable the network controller to indicate common beam for multiple elements such as multiple channels, multiple component carriers, and multiple UEs, etc. in one layer-1 (L1) or layer-2 (L2) control message, therefore reducing latency and overhead for common beam indication and updating/switching.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
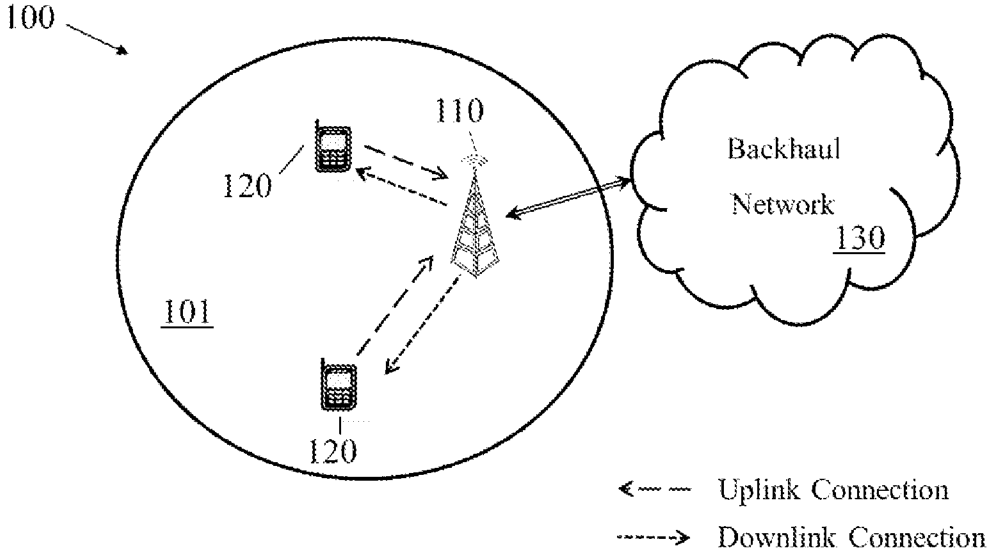
FIG. 1 illustrates a diagram of an embodiment network for wireless communication.

Existing beam management procedures lack efficient support for common beam indication and updating/switching in some deployment scenarios. For example, in a frequent deployment scenario where a common beam is used for DL control channel and DL data channel transmission, to update the common beam for DL control channel and DL data channel transmission, two separate beam control messages may be required, one for beam update for DL control channel transmission, and one for beam update for DL data channel transmission. The two beam control messages may be in different format as well. For example, the beam control message for beam update for DL control channel transmission is a MAC CE while the beam control message for beam update for DL data channel transmission is a DCI message.

Similarly, in a frequent deployment scenario where a common beam is used for UL control channel and UL data channel transmission, two separate beam control messages may be required to update the common beam for UL control channel and UL data channel transmission, one for beam update for UL control channel transmission, and one for beam update for UL data channel transmission. The two beam control messages may be in different format. For example, the beam control message for beam update for UL control channel transmission is a MAC CE while the beam control message for beam update for UL data channel transmission is a DCI message.

In another example, in some scenarios the uplink control and data channels may utilize a correspondence beam of the common downlink beam. For example, a UE may use the receive spatial filter in reception of the DL control channel and DL data channel as the transmit spatial filter for transmission of the UL control channel and UL data channel. To update the common beam (e.g., spatial filter) for DL control channel, DL data channel, UL control channel, and UL data channel, four separate control messages may be required, one for each of the beam updates for DL/UL control/data channels.

As illustrated in the aforementioned examples, the existing beam management procedures for common beam indication and updating/switching are inefficient. It requires multiple control messages to indicate/update common beam for multiple channels, thus resulting in larger latency and higher overhead.

Embodiments of the present disclosure provide methods for common beam indication for multiple elements such as multiple channels, multiple component carriers, and multiple UEs, etc. in one layer-1 (L1) or layer-2 (L2) control message, therefore reducing latency and overhead for common beam indication and updating/switching. According to some embodiments, a network controller may transmit to a communication device, a first control message comprising a first indicator indicating a plurality of source reference signals and a second indicator indicating a plurality of target elements, wherein the plurality of source reference signals instruct the communication device to determine at least one of a quasi co-location (QCL) information or a spatial filter information in accordance with the plurality of source reference signals, and wherein the plurality of target elements instruct the communication device to use the at least one of the QCL information or the spatial filter information when performing operation on the plurality of target elements. The plurality of target elements may comprise a plurality of channels such as the PDSCH, PDCCH, CSI-RS, PUSCH, PUCCH, and SRS, etc., therefore enable common beam indication for multiple channels in one control message. The communication device, upon receiving the first control message, may determine a spatial filter information and/or a QCL information in accordance with the first indicator. For example, the spatial filter information may be a spatial filter parameter, and the QCL information may be a QCL property such as QCL-TypeD which is a spatial domain QCL property. The UE may determine the plurality of target elements such as the target channel(s) in accordance with the second indicator. The UE may then operate on the plurality of target elements such as the target channel(s) using the spatial filter information and/or the QCL information.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110, and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB or gNB compliant with various 4G and 5G standards promulgated by 3GPP, and evolutions of such standards), master eNB (MeNB), secondary eNB (SeNB), master gNB (MgNB), secondary gNB (SgNB), control node, access node, transmission point (TP), TRP, a cell, a carrier, a macro-cell, a femtocell, a pico cell, a Wi-Fi access point (AP), a network controller, or other wirelessly enabled devices. Base stations may provide wireless access in accordance with one or more wireless communication protocols, e.g., long term evolution (LTE), LTE advanced (LTE-A), 3GPP Rel. 15 and subsequent release, High Speed Packet Access (HSPA), Wi-Fi 802.11a/b/g/n/ac, ax and other 802.11xx standards. As used herein, the term "mobile device" refers to any component (or collection of components) capable of establishing a wireless connection with a base station, such as a user equipment (UE), a mobile station (STA), a relay node, an integrated access and backhaul (IAB) node, and other wirelessly enabled devices. In some embodiments, the network 100 may comprise various other wireless devices, such as relays, low power nodes, UE with sidelink (D2D) communications, etc.

A cell may include one or more bandwidth parts (BWPs) for UL or DL allocated for a UE. Each BWP may have its own BWP-specific numerology and configuration, such as the BWP's bandwidth and subcarrier spacing. It is noted that not all BWPs need to be active at the same time for the UE. A cell may correspond to one carrier, and in some cases, multiple carriers. Typically, one cell (a primary cell (PCell) or a secondary cell (SCell), for example) is a component carrier (a primary component carrier (PCC) or a secondary CC (SCC), for example). For some cells, each cell may include multiple carriers in UL, one carrier is referred to as an UL carrier or non-supplementary UL (non-SUL, or simply UL) carrier which has an associated DL, and other carriers are called supplementary UL (SUL) carriers which do not have an associated DL. A cell, or a carrier, may be configured with slot or subframe formats comprised of DL and UL symbols, where examples of the duration of a slot may be 0.25 milliseconds (ms), 0.5 ms, and 1 ms, etc., and that cell or carrier is seen as operating in a time division duplexed (TDD) mode. In general, for unpaired spectrum, the cells or carriers are in TDD mode, and for paired spectrum, the cells or carrier are in a frequency division duplexed (FDD) mode. A transmission time interval (TTI) generally corresponds to a subframe (in LTE) or a slot (in 5G New Radio (NR)). For example, in 5G NR, a slot may consist of 14 orthogonal frequency division multiplex (OFDM) symbols. A resource element consists of one subcarrier during one OFDM symbol, while 12 consecutive subcarriers in the frequency domain are called a resource block (RB).

Generally, to provide any data channels in either downlink or uplink transmissions, such as a PDSCH or a PUSCH, reference signals are transmitted. There are reference signals for a UE to use to perform channel/signal estimation/measurements, for demodulation of PDCCH and other common channels as well as for some measurements and feedback, e.g., the common/cell-specific reference signal (CRS) inherited from the Release 8/9 specification of evolved universal terrestrial radio access (E-UTRA). A dedicated/demodulation reference signal (DMRS) may be transmitted together with the PDSCH in Release 10 of E-UTRA. DMRS is used for channel estimation during PDSCH demodulation. In later E-UTRA releases and in NR, DMRS is used for channel estimation during PDCCH/PDSCH/PUSCH/PBCH demodulation. In Release 10, the channel state information reference signal (CSI-RS) is introduced in addition to CRS and DMRS. CSI-RS is used for Release 10 UEs to measure the channel status, especially for multiple antennas cases. PMI/CQI/RI and other feedback information may be based on the measurement of CSI-RS for Release 10 and beyond UEs. PMI is the precoding matrix indicator, CQI is the channel quantity indicator, and RI is the rank indicator of the precoding matrix. CSI-RS in Release 10 may support up to 8 transmission antennas, while CRS may support up to 4 transmission antennas in Release 8/9. The number of CSI-RS antenna ports may be 1, 2, 4, or 8. In addition, to support the same number of antenna ports, CSI-RS has a lower overhead due to its low density in time and frequency. In Release 13, beamformed/precoded CSI-RS is introduced, and a UE can be configured to receive one or more precoded CSI-RS and report a CSI with the associated precoded CSI-RS resource index (CRI). In NR, 16 and 32 ports in CSI-RS are supported.

Figure 2:
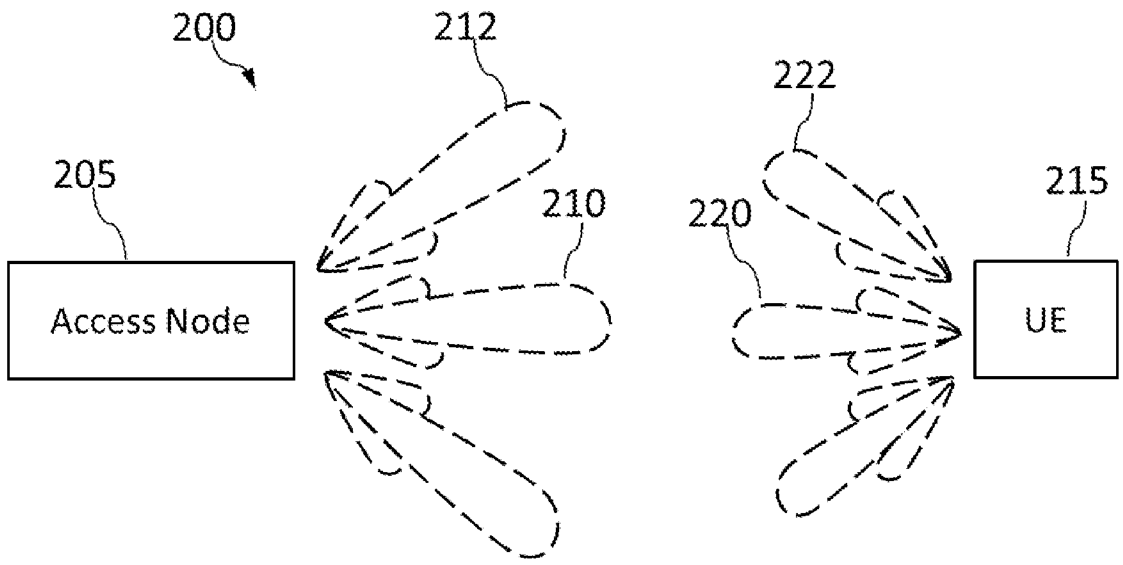
FIG. 2 illustrates a diagram of an embodiment communications system with beamforming.

As discussed previously, path loss in communications systems operating at high frequency (HF) (6 gigahertz (GHz) and above, such as millimeter wavelength (mm-Wave)) operating frequencies is high, and beamforming may be used to overcome the high path loss. FIG. 2 illustrates a diagram of an embodiment communications system 200 with beamforming. The communications system 200 includes an access node, e.g., a base station, 205, communicating with a UE 215. As shown in FIG. 2, both access node 205 and UE 215 communicate using beamformed transmissions and receptions. As an example, access node 205 communicates using a plurality of communications beams, including beams 210 and 212, while UE 215 communicates using a plurality of communications beams, including beams 220 and 222. Examples of the operation of reception include demodulation, decoding, and channel estimation, etc.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals and/or receive uplink signals. It should also be appreciated that the term “beam”, “spatial filter”, “QCL”, and “QCL-TypeD” may be used interchangeably throughout this document.

Figure 3:
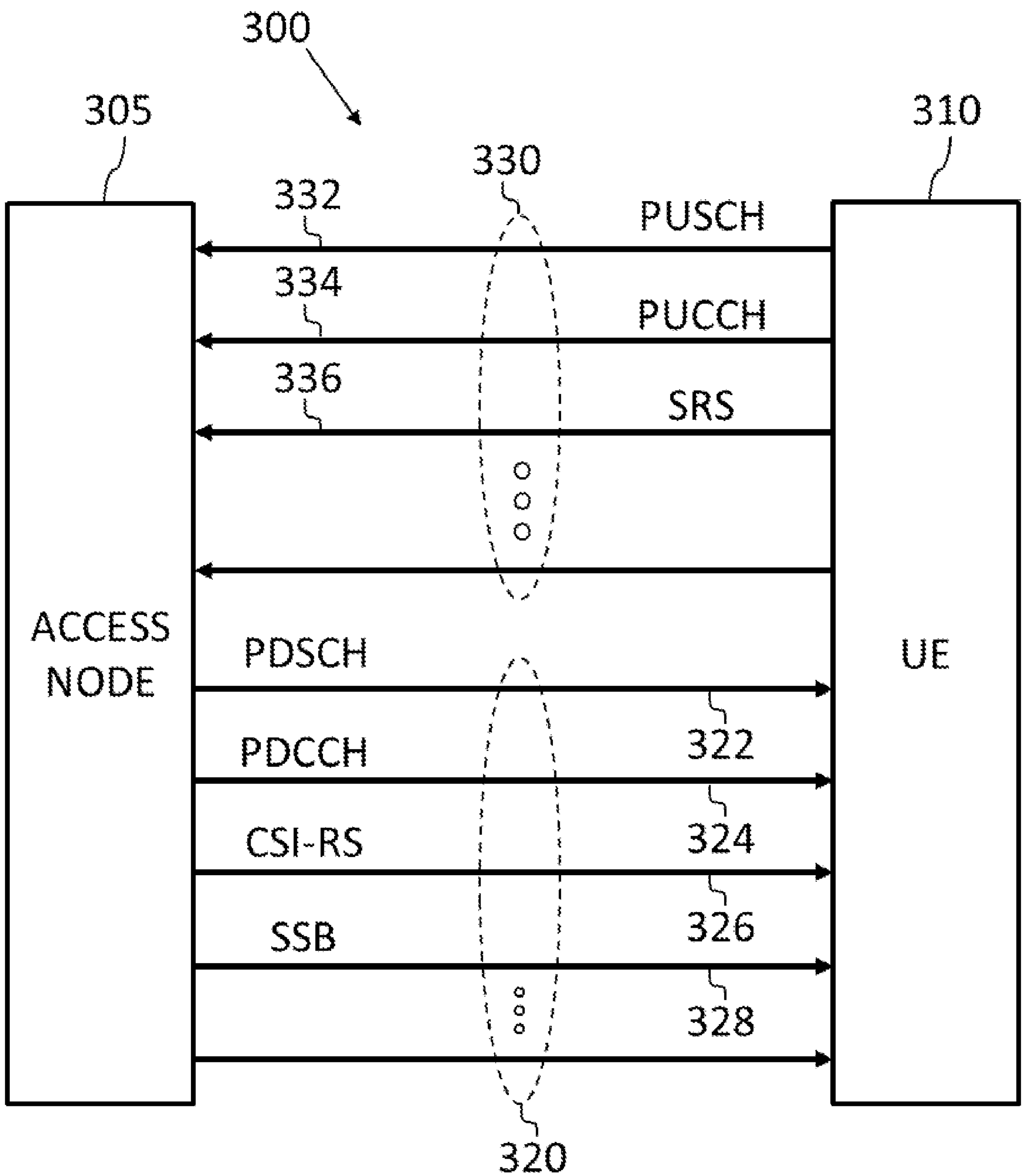
FIG. 3 illustrates a diagram of an embodiment communications system showing an example channel structure.

FIG. 3 illustrates a communications system 300 highlighting an example channel structure between an access node 305 and a UE 310. In a bi-directional communications implementation, there is a downlink channel 320 and an uplink channel 330 between access node 305 and UE 310. Downlink channel 320 and uplink channel 330 may each include a plurality of unidirectional channels. As shown in FIG. 3, downlink channel 320 includes a PDSCH 322, a PDCCH 324, a CSI-RS 326, and a synchronization signal block (SSB) 328 among others. Uplink channel 330 includes a PUSCH 332, a PUCCH 334, and a SRS 336 among others. Other channels may be present in downlink channel 320 or uplink channel 330 but are not shown in FIG. 3.

In existing beam indication frameworks, DCI messages and MAC CE messages provide fast L1 and L2 signaling to handle intra-cell mobility, while RRC messages provide slow higher layer signaling to handle inter-cell mobility. For example, for a downlink TCI state update, an RRC message provides relatively slow signaling and may take on the order of hundreds of milliseconds. A MAC CE message may be used to activate and update some TCI states in approximately 10 ms. Similarly, an RRC may take hundreds of milliseconds to configure uplink spatial relations, and a MAC CE may activate and update uplink spatial relations in approximately 10 ms.

Examples of Existing Beam Signaling Includes

PDCCH:

RRC configures up to 64 TCI states.

MAC CE activates 1 TCI state for each control resource set (CORESET).

PDSCH:

RRC configures up to 128 TCI states.

MAC CE activates up to 8 TCI states.

A 3-bit TCI field in DCI to indicate one of the 8 TCI states.

CSI-RS:

Periodic CSI-RS (P-CSI-RS)/tracking reference signal (TRS): RRC configure resource and TCI states, RRC activates.

Aperiodic CSI-RS (AP-CSI-RS): RRC configures resource and TCI states, MAC CE activates, DCI triggers.

Aperiodic TRS (AP-TRS): Quasi co-located (QCLed) to a P-TRS, MAC CE activates, DCI triggers.

Semipersistent CSI-RS (SP-CSI-RS)/Channel state information for interference measurement (CSI-IM): RRC configures resource, MAC CE configures TCI states, MAC CE activates.

PUCCH:

RRC configures up to 8 spatial relations.

MAC CE activates one spatial relation for a PUCCH resource.

A 3-bit PUCCH resource indicator in DCI indicate which PUCCH resource to transmit uplink control information (UCI).

PUSCH:

SRS resource indicator in DCI indicates the spatial relations to SRS.

SRS:

Periodic SRS (P-SRS): RRC configures resource and spatial relation, RRC activates.

Semipersistent SRS (SP-SRS): RRC configures resource and spatial relation, MAC CE activates.

Aperiodic SRS (AP-SRS): RRC configures resource and spatial relation, MAC CE updates spatial relation.

As discussed previously, existing beam management procedures lack efficient support for common beam indication and updating/switching in some deployment scenarios. The example deployment scenarios include, among others: a frequent deployment scenario where a common beam is used for DL control channel and DL data channel transmission, a frequent deployment scenario where a common beam is used for UL control channel and UL data channel transmission, and some scenarios where the uplink control and data channels may utilize a correspondence beam of the common downlink beam. In these example deployment scenarios, the existing beam management procedures for common beam indication and updating/switching are inefficient. The reason is that it requires multiple control messages to indicate/update common beam for multiple channels, with some of the control message being RRC message, thus resulting in larger latency and higher overhead.

It is therefore beneficial to provide system and methods for more efficient beam management for multi-beam operation situations in which a common beam is used for uplink and/or downlink data and control transmissions, for situations in which a common beam is used for communications across multiple component carriers, and for situations in which a common beam is used for communications with a group of UEs. Examples of communications across multiple component carriers include contiguous intra-band carrier aggregation (CA), noncontiguous intra-band CA, and inter-band CA.

Embodiments of the present disclosure provide apparatus and methods for enhanced common beam indication and updating/switching. For common beam indication across multiple channels, the base station first transmits to the UE a first control message. In one embodiment, the first control message is an RRC message. In another embodiment, the first control message is a MAC CE. The first control message comprises configuration information to configure one or more groups of channels. The configuration information may comprise one or more group information, where a group information comprises a group identification (ID) or a group index that identifies the group, and indication of members or elements of the group. In this example, channels are elements/members of the group and the indication of members of the group may be a list of channels. In one embodiment, each channel of the group is indicated by the channel type such as PDSCH, PDCCH, and PUSCH, etc. In another embodiment, each channel of the group may be indicated by a channel ID and/or a resource ID. In yet another embodiment, each channel of the group may be indicated in a hierarchical structure where a channel type indication is followed by a channel ID or a resource ID. For example, a PDCCH may be indicated with a channel type PDCCH followed by a CORESET ID, and a PUCCH may be indicated with a channel type PUCCH followed by a resource ID. The indication of members of the group may also be a bitmap, with each bit in the bitmap corresponding to a channel. A bit set to one indicates that the corresponding channel is a member of the group, while a bit set to zero indicates that the corresponding channel is a not a member of the group. Other bitmap settings are possible, e.g., a bit set to zero indicates that the corresponding channel is a member of the group, while a bit set to one indicates that the corresponding channel is a not a member of the group.

Channels within the same group share the same beam. For example, the UE may assume that a spatial filter determined in accordance with a source reference signal may be used for operation on the multiple channels within the same group. The source reference signal may be viewed as being associated with a beam, being a reference to a beam, being associated with a QCL-TypeD property, being a reference to a QCL-TypeD property, being associated with a spatial filter, and/or being a reference to a spatial filter.

In one embodiment, when multiple DL channels such as a PDSCH and a PDCCH, among others, are in the same group, the UE may assume that the receive spatial filter determined for reception of a DMRS of the PDSCH may be used for reception of a DMRS of the PDCCH and other channels within the same group, and vice versa. In another embodiment, when multiple UL channels such as a PUSCH and a PUCCH, among others, are in the same group, the UE may assume that the transmit spatial filter determined for transmission of a DMRS of the PUSCH may be used for transmission of a DMRS of the PUCCH and other channels within the same group, and vice versa. In yet another embodiment, when multiple DL channels and UL channels, such as a PDSCH and a PUSCH, among others, are in the same group, the UE may assume that the receive spatial filter determined for reception of a DMRS of the PDSCH may be used as transmit spatial filter for transmission of a DMRS of the PUSCH and other channels within the same group. Note that throughout this document the reception operation may include operations such as demodulation, decoding, and channel estimation, etc.

As another example, the UE may assume that a QCL-TypeD property determined in accordance with a source reference signal may be used for operation on the multiple channels within the same group. In one embodiment, when multiple DL channels such as a PDSCH and a PDCCH, among others, are in the same group, the UE may assume that the QCL-TypeD property determined for reception of a DMRS of the PDSCH may be used for reception of a DMRS of the PDCCH and other channels within the same group, and vice versa. In another embodiment, when multiple UL channels such as a PUSCH and a PUCCH, among others, are in the same group, the UE may assume that the QCL-TypeD property determined for transmission of a DMRS of the PUSCH may be used for transmission of a DMRS of the PUCCH and other channels within the same group, and vice versa. In yet another embodiment, when multiple DL channels and UL channels, such as a PDSCH and a PUSCH, among others, are in the same group, the UE may assume that the QCL-TypeD property determined for reception of a DMRS of the PDSCH may be used for transmission of a DMRS of the PUSCH and other channels within the same group.

The information of the source reference signal may be indicated in a TCI state. Examples of the source reference signal include CSI-RS, SSB, and SRS, etc. Examples of the information of the source reference signal include resource identification (ID) of the source reference signal and channel index of the source reference signal, such as the CSI-RS resource ID, the SSB index, and SRS resource ID, etc. As discussed previously, the source reference signal may be viewed as being associated with a beam, being a reference to a beam, being associated with a QCL-TypeD property, being a reference to a QCL-TypeD property, being associated with a spatial filter, and/or being a reference to a spatial filter. Therefore a TCI state comprising indication of a source reference signal may serve the purpose of beam indication. If the TCI state of one of the channels in the group is updated, the TCI state of the rest of the channels in the group will also be updated accordingly without additional signaling. Particularly, if the beam of one of the channels in the group is updated, the beam of the rest of the channels in the group will also be updated accordingly without additional signaling. For example, if beam correspondence between DL and UL is assumed, one group of channels may be defined where the group include {PDSCH, PDCCH, CSI-RS, PUSCH, PUCCH, SRS}. If the TCI state of the PDSCH DMRS is updated through DCI signaling, the TCI states of the other channels in the group are also updated to the same TCI state of the PDSCH DMRS. No additional signaling is needed to update the UL TCI states for the PUSCH DMRS, the PUCCH DMRS, and SRS. Note that for reference convenience, TCI states for PDSCH DMRS, PDCCH DMRS, PUCCH DMRS, PUSCH DMRS may be referred to as TCI states for PDSCH, PDCCH, PUCCH, and PUSCH, respectively, throughout the document. Similarly, for reference convenience, PDSCH DMRS, PDCCH DMRS, PUCCH DMRS, PUSCH DMRS may be referred to as PDSCH, PDCCH, PUCCH, and PUSCH, respectively, throughout the document.

In another example, if beam correspondence between DL and UL cannot be assumed, two group of channels may be defined where one group includes {PDSCH, PDCCH, CSI-RS}, e.g., the DL group, and the other group includes {PUSCH, PUCCH, SRS}, e.g., the UL group. In this example, the TCI state updates for the DL group and the UL group may be performed separately such that the DL receive beam and the UL transmit beam may be different. In yet another example, the members of the group comprise at least one of PDSCH, PDCCH, CSI-RS, PUSCH, PUCCH, and/or SRS channels. If the TCI state of one of the channels in the group is updated, the TCI state of the rest of the channels in the group will also be updated accordingly without additional signaling.

After the base station transmits to the UE the first control message indicating the group configuration information, the base station transmits to the UE a second control message for common beam indication/updating/switching for multiple channels. In one embodiment, the second control message is a DCI message. The DCI message comprises a plurality of TCI fields indicating a plurality of TCI states the UE should use for communication with the base station. As discussed previously, a TCI state comprising indication of a source reference signal may be used for beam indication. Therefore, the plurality of TCI fields may indicate a plurality of common beam(s) the UE should use for communication with the base station. The DCI message also comprises indication of the group to which the plurality of common beam(s) should be applied. Hence the DCI message comprises both the information of the source reference signal(s) indicating the common beam(s) and indicator indicating the target channel(s) that the common beam(s) should be applied to.

In another embodiment, the second control message is a MAC CE. Similarly, the MAC CE comprises a plurality of TCI fields indicating a plurality of TCI states the UE should use for communication with the base station. The plurality of TCI fields may indicate a plurality of common beam(s) the UE should use for communication with the base station. The MAC CE also comprises indication of the group to which the plurality of common beam(s) should be applied. Hence the MAC CE comprises both the information of the source reference signal(s) indicating the common beam(s) and indicator indicating the target channel(s) that the common beam(s) should be applied to.

In one embodiment, the indication of the group in the second control message comprises a group ID or a group index that identifies the group. Since the UE already receives the group configuration information in the first control message, the UE may determine the elements/members (e.g., channels) of the group in accordance with the group ID or the group index.

In another embodiment, the indication of the group in the second control message is implicit. In this example, the group is not explicitly indicated by a group ID or a group index, instead, it may be indicated implicitly, e.g., through an indication of a member of the group. For example, if a PDSCH is a member of the group, a DCI message that schedules the PDSCH transmission and comprises a TCI field may implicitly indicate that the TCI field should be applied to all the channels of the group that the PDSCH belongs to. Particularly, all the channels of the group that the PDSCH belongs to should use the TCI state(s) (e.g., common beam(s)) the TCI field indicates. In another example, if a PUSCH is a member of the group, a DCI message that schedules the PUSCH transmission and comprises a TCI field may implicitly indicate that the TCI field should be applied to all the channels of the group that the PUSCH belongs to. Particularly, all the channels of the group that the PUSCH belongs to should use the TCI state(s) (e.g., common beam(s)) the TCI field indicates.

The UE, upon receiving the second control message with common beam indication/updating/switching, may determine the plurality of common beam(s) in accordance with the information of the source reference signal(s). For example, the UE may determine a spatial filter information and/or a QCL-TypeD information. The spatial filter information may be a spatial filter parameter, and the QCL-TypeD information may be a QCL-TypeD property which is a spatial domain QCL property. The UE may determine the target channel(s) in accordance with the indication of the group. The UE may then operate on the target channel(s) using the spatial filter information and/or the QCL-TypeD information.

In one embodiment, overhead may be further reduced by removing the first control message. In this embodiment, the base station does not transmit the first control message to the UE. The base station uses DCI message of an existing format, for example, DCI formats 1_1 or 1_2 for scheduling transmission of PDSCH on the downlink. The DCI message comprises a TCI field indicating TCI state update/beam indication for some or all DL channels. The base station also uses DCI message of an existing format, for example, DCI formats 1_1 or 1_2 for UL TCI state update/beam indication. The DCI message comprises a TCI field indicating TCI state update/beam indication for some or all UL channels. However, existing DCI formats 1_1 and 1_2 are used for scheduling transmission of PDSCH on the downlink. To use DCI formats 1_1 and 1_2 for UL-only beam indication, some enhancements are needed to differentiate between the usage for DL scheduling and for UL-only beam indication. One method is for the base station to use an Radio Network Temporary Identifier (RNTI) that is different from Cell RNTI (C-RNTI), Configured Scheduling (CS-RNTI), and Modulation and Coding Scheme RNTI (MCS-RNTI) to scramble the Cyclic Redundancy Check (CRC) of the DCI. The CRC of the existing DCI formats 1_1 and 1_2 is scrambled by C-RNTI or CS-RNTI or MCS-RNTI. The new RNTI, which is names as UL Beam Indication RNTI (UBI-RNTI), can be used to scramble CRC of the DCI. The UE, upon receiving the DCI, can then use this UBI-RNTI to descramble the CRC of the received DCI to identify whether the received DCI is for UL-only beam indication. If after descrambling using UBI-RNTI, the CRC passes, it indicates that the received DCI is for UL-only beam indication. Otherwise, the received DCI is not for UL-only beam indication or the DCI is received in error.

In another embodiment, the base station uses DCI message of an existing format, for example, DCI formats 1_1 or 1_2 for TCI state update/beam indication. In one alternative, the DCI formats 1_1 or 1_2 comprises DL assignment information. In another alternative, the DCI formats 1_1 or 1_2 does not comprise DL assignment information. In this embodiment, no new RNTI is required to indicate that the DCI is used for UL beam indication. Depending on the TCI state(s) indicated by the TCI field of the DCI message, the DCI message may be used to indicate DL TCI state, UL TCI state, joint DL/UL TCI state, both DL TCI and UL TCI states, and multiple TCI states. By joint DL/UL TCI state, it refers to TCI state that may be used for beam indication for both DL channels and UL channels for the UE. By multiple TCI states, it refers to cases where multiple DL TCI states, multiple UL TCI states, or multiple joint DL/UL TCI states are indicated in one instance of DCI. The mapping between TCI state(s) and codepoint(s) of the TCI field of the DCI message is indicated by the base station to the UE in UE-specific TCI states activation/deactivation MAC CE. For reference convenience, codepoint of the TCI field of the DCI message may be referred to as TCI codepoint throughout the document.

Since the existing UE-specific TCI states activation/deactivation MAC CE only supports mapping between DL TCI state(s) and TCI codepoints, enhancements on the existing MAC CE are therefore needed.

Figure 3A:
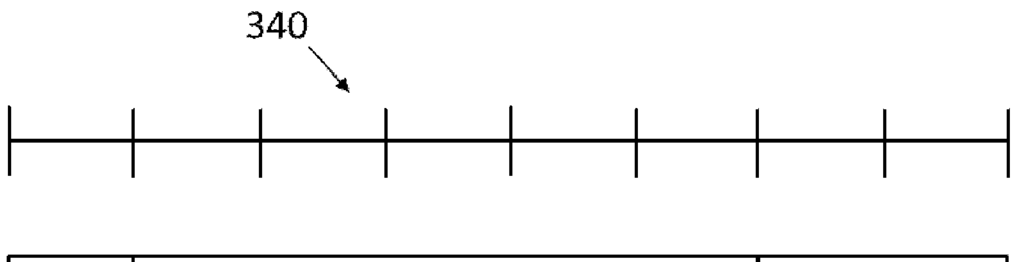
FIG. 3A illustrates a diagram of embodiment UE-specific TCI states activation/deactivation MAC CE.

In one embodiment, the DL TCI state(s), UL TCI state(s), and joint DL/UL TCI state(s) are from a single TCI state pool. This TCI state pool may be indicated by the base station to the UE through RRC signaling. For example, one RRC message may comprise a list of TCI-state information elements (IEs) corresponding to the possible DL TCI states, UL TCI states, and joint DL/UL TCI states. Each of the TCI-state IEs comprises a TCI state ID that identifies the corresponding TCI state. The existing UE-specific TCI states activation/deactivation MAC CE may be used to map different TCI state to different TCI codepoint. FIG. 3A illustrates a diagram of embodiment UE-specific TCI states activation/deactivation MAC CE 340. As shown in FIG. 3A, the field Ti (i=0, 1, 2, . . . ) indicates if the TCI state with TCI state ID i is activated and should be mapped to a TCI codepoint. For example, if Ti is set to "1" it indicates that TCI state with TCI state ID i is activated and if Ti is set to "O" it indicates that TCI state with TCI state ID i is deactivated, or vice versa. Different from the existing MAC CE where all the TCI states indicated by the fields Ti are DL TCI states, in this embodiment, the TCI states indicated by the field Ti may be DL TCI states, UL TCI states, or joint DL/UL TCI states. Therefore, among the TCI states activated by the MAC CE, some may be DL TCI states, some may be UL TCI states, and some may be joint DL/UL TCI states. The TCI codepoints of the activated TCI states are determined in accordance with the order of the corresponding Ti field. For example, the first TCI state with Ti field set to 1 is mapped to TCI codepoint value 0, the second TCI state with Ti field set to 1 is mapped to TCI codepoint value 1, and so on. Note that in this example, the size of the Ti field is one bit. The UE, after receiving the MAC CE from the base station, may derive the mapping between the TCI state(s) and the TCI codepoint(s). The UE, after receiving the DCI message with TCI field, may then derive the TCI state(s) in accordance with the TCI codepoint(s) and the mapping between the TCI state(s) and the TCI codepoint(s). The UE may then determine a spatial filter information and/or a QCL-TypeD information for DL reception, UL transmission, or both, depending on the TCI state indicated in the DCI message. If the TCI state indicated in the DCI message is DL TCI state, the UE may determine a spatial filter information and/or a QCL-TypeD information for DL reception in accordance with the TCI state. If the TCI state indicated in the DCI message is UL TCI state, the UE may determine a spatial filter information and/or a QCL-TypeD information for UL transmission in accordance with the TCI state. If the TCI state indicated in the DCI message is joint DL/UL TCI state, the UE may determine a spatial filter information and/or a QCL-TypeD information for DL reception as well as a spatial filter information and/or a QCL-TypeD information for UL transmission in accordance with the TCI state.

Figure 3B:
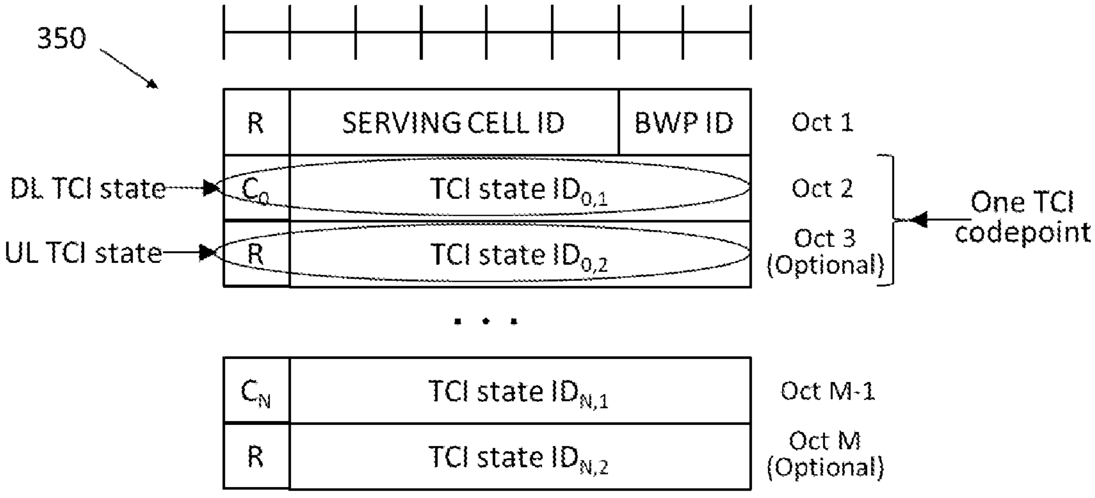
FIG. 3B illustrates a diagram of another embodiment UE-specific TCI states activation/deactivation MAC CE.

In another embodiment, another existing UE-specific TCI states activation/deactivation MAC CE may be used to map both a DL TCI state and a UL TCI state to a TCI codepoint. In this embodiment, the DL TCI state(s), UL TCI state(s), and joint DL/UL TCI state(s) are from a single TCI state pool. FIG. 3B illustrates a diagram of another embodiment UE-specific TCI states activation/deactivation MAC CE 350. As shown in FIG. 3B, two TCI states are mapped to a TCI codepoint, one is a DL TCI state and another is a UL TCI state. In this example, TCI state ID0, 1 is for a DL TCI state and is mapped to TCI codepoint value 0, and TCI state ID0, 2 is for a UL TCI state and is also mapped to TCI codepoint value 0. In this example, each of the TCI codepoints may be mapped to both a DL TCI state and a UL TCI state, DL TCI state, UL TCI state, or joint DL/UL TCI state. For example, if the size of the TCI field of the DCI message is 3 bits, there are a total of 8 TCI codepoints. The first TCI codepoint with value 0 may be mapped to both a DL TCI state and a UL TCI state. The second TCI codepoint with value 1 may be mapped to a DL TCI state. The third TCI codepoint with value 2 may be mapped to a UL TCI state. The fourth TCI codepoint with value 3 may be mapped to a joint DL/UL TCI state, and so on. Other different mappings are possible. The most-significant-bit (MSB) of an octet except the first octet in the MAC CE may be used to indicate if there exists another TCI state that is indicated in the next octet and is mapped to the same TCI codepoint. For example, the MSB of the second octet "Oct 2", "Co" may be set to "1" to indicate that the TCI state ID0, 2 indicated in the next octet "Oct 3" is mapped to the same TCI codepoint 0 as the TCI state ID0, 1 indicated in octet "Oct 2". The value of a TCI codepoint may then be decided in accordance with the order of the TCI codepoint in the MAC CE. The MSB of the first octet of the MAC CE, e.g., the "R" bit in octet "Oct 1", may be used to indicate CORESET pool ID or coresetPoolIndex for multiple DCI cases. For example, if this bit is set to "0", it indicates that the mapping between the TCI states(s) and the TCI codepoint(s) indicated in the MAC CE is specific to coresetPoolIndex 0. If this bit is set to "1", it indicates that the mapping between the TCI states(s) and the TCI codepoint(s) indicated in the MAC CE is specific to coresetPoolIndex 1. The UE, after receiving the MAC CE from the base station, may derive the mapping between the TCI state(s) and the TCI codepoint(s). The UE, after receiving the DCI message with TCI field, may then derive the TCI state(s) in accordance with the TCI codepoint(s) and the mapping between the TCI state(s) and the TCI codepoint(s). The UE may then determine a spatial filter information and/or a QCL-TypeD information for DL reception, UL transmission, or both, depending on the TCI state(s) indicated in the DCI message. If the TCI state indicated in the DCI message is DL TCI state, the UE may determine a spatial filter information and/or a QCL-TypeD information for DL reception in accordance with the TCI state. If the TCI state indicated in the DCI message is UL TCI state, the UE may determine a spatial filter information and/or a QCL-TypeD information for UL transmission in accordance with the TCI state. If the TCI state indicated in the DCI message is joint DL/UL TCI state, the UE may determine a spatial filter information and/or a QCL-TypeD information for DL reception as well as a spatial filter information and/or a QCL-TypeD information for UL transmission in accordance with the TCI state. If the TCI states indicated in the DCI message includes both a DL TCI state and a ULTCI state, the UE may determine a spatial filter information and/or a QCL-TypeD information for DL reception in accordance with the DL TCI state as well as a spatial filter information and/or a QCL-TypeD information for UL transmission in accordance with the UL TCI state.

Figure 3C:
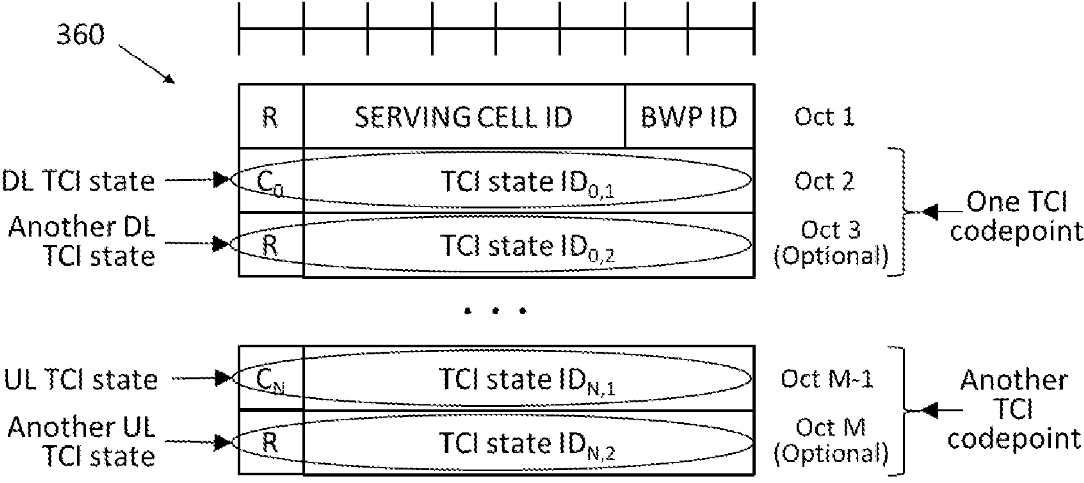
FIG. 3C illustrates a diagram of another embodiment UE-specific TCI states activation/deactivation MAC CE with multiple TCI states mapped to a TCI codepoint.

In yet another embodiment, existing UE-specific TCI states activation/deactivation MAC CE may be used to map multiple DL TCI states, multiple UL TCI states, or multiple joint DL/UL TCI states to a TCI codepoint. In this embodiment, the DL TCI state(s), UL TCI state(s), and joint DL/UL TCI state(s) are from a single TCI state pool. FIG. 3C illustrates a diagram of another embodiment UE-specific TCI states activation/deactivation MAC CE 360 with multiple TCI states mapped to a TCI codepoint. As shown in FIG. 3C, two DL TCI states are mapped to a TCI codepoint and two UL TCI states are mapped to another TCI codepoint. In FIG. 3C, two TCI states are used as an example to show that multiple TCI states are mapped to one TCI codepoint. Other number of TCI states, for example, three TCI states, four TCI states, etc., are possible to be mapped to one TCI codepoint. In this example, the MSB of each of the octets except the first octet "Oct 1" is used to indicate whether the TCI state indicated in the next octet and the TCI state indicated in the current octet are mapped to the same TCI codepoint. For example, in octet "Oct 2", the MSB "Co" may be set to "1" to indicate that the TCI state indicated in the next octet "Oct 3", e.g., the one with TCI state ID0, 2, is mapped to the same TCI codepoint 0 as TCI state ID0, 1. And in octet "Oct 3", the MSB "R" may be set to "0" to indicate that the TCI state indicated in the next octet, the fourth octet, is mapped to a different TCI codepoint, e.g., TCI codepoint 1. In this example, two TCI states are mapped to TCI codepoint 0. On the other hand, if the MSB of octet "Oct 2" and the MSB of octet "Oct 3" are both set to "1", it indicates that the TCI state indicated in the fourth octet is also mapped to the same TCI codepoint 0 as TCI state ID0, 1 and TCI state ID0, 2. The MSB of the fourth octet may be set to "0" to indicate that the TCI state indicated in the fifth octet is mapped to a different TCI codepoint, e.g., TCI codepoint 1. In this example, three TCI states are mapped to TCI codepoint 0. In fact, the MSB of an octet other than the first octet in the MAC CE may be used to indicate whether the TCI state indicated in the corresponding octet is the last TCI state mapped to a TCI codepoint. The MSB of an octet other than the first octet may then be used to identify the boundary of mappings for different TCI codepoints since a value of "0" of the MSB of an octet may indicate that the TCI state with the TCI state ID indicated in the octet is the last TCI state mapped to a TCI codepoint. The value of a TCI codepoint may then be decided in accordance with the order of the TCI codepoint in the MAC CE. For example, the first TCI codepoint in the MAC CE is of value 0, the second TCI codepoint in the MAC CE is of value 1, and so on. The UE, after receiving the MAC CE from the base station, may derive the mapping between the TCI state(s) and the TCI codepoint(s).

The UE, after receiving the DCI message with TCI field, may then derive the TCI state(s) in accordance with the TCI codepoint(s) and the mapping between the TCI state(s) and the TCI codepoint(s). The UE may then determine a plurality of spatial filter information and/or a QCL-TypeD information for DL reception and UL transmission, depending on the TCI state(s) indicated in the DCI message. If the TCI state indicated in the DCI message is DL TCI state, the UE may determine a spatial filter information and/or a QCL-TypeD information for DL reception in accordance with the TCI state. If the TCI state indicated in the DCI message is UL TCI state, the UE may determine a spatial filter information and/or a QCL-TypeD information for UL transmission in accordance with the TCI state. If the TCI state indicated in the DCI message is joint DL/UL TCI state, the UE may determine a spatial filter information and/or a QCL-TypeD information for DL reception as well as a spatial filter information and/or a QCL-TypeD information for UL transmission in accordance with the TCI state. If the TCI states indicated in the DCI message are multiple DL TCI states, the UE may determine multiple spatial filter information and/or multiple QCL-TypeD information for DL reception in accordance with the multiple TCI states. For support of CORESET beam diversity, each of the multiple spatial filter information and/or multiple QCL-TypeD information may be used for DL reception of a CORESET or a subset of CORESETs. The spatial filter information and/or QCL-TypeD information used for DL reception of PDSCH may be set to the one determined in accordance with the first of the multiple TCI states. For support of multiple TRP, each of the multiple spatial filter information and/or multiple QCL-TypeD information may be used for DL reception for a TRP. If the TCI states indicated in the DCI message are multiple UL TCI states, the UE may determine multiple spatial filter information and/or multiple QCL-TypeD information for UL transmission in accordance with the multiple TCI states. If the TCI states indicated in the DCI message are multiple joint DL/UL TCI states, the UE may determine multiple spatial filter information and/or multiple QCL-TypeD information for DL reception as well as multiple spatial filter information and/or multiple QCL-TypeD information for UL transmission in accordance with the multiple TCI states.

Figure 3D:
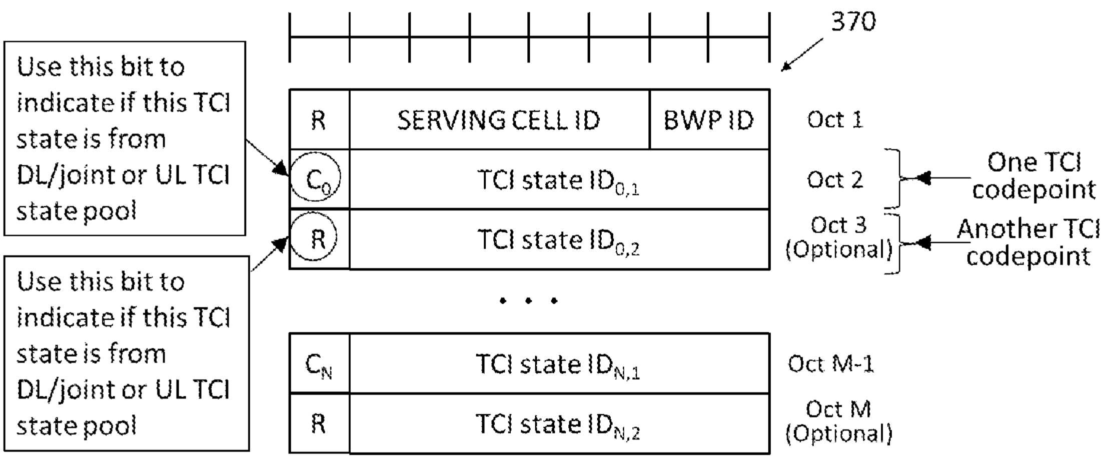
FIG. 3D illustrates a diagram of another embodiment UE-specific TCI states activation/deactivation MAC CE with DL TCI state(s) and joint DL/UL TCI state(s) from one TCI state pool and UL TCI state(s) from another TCI state pool.

In one embodiment, the DL TCI state(s), UL TCI state(s), and joint DL/UL TCI state(s) are from different TCI state pools. For example, the DL TCI states and joint DL/UL TCI states are from a DL/joint TCI state pool whereas the UL TCI states are from a UL TCI state pool. The two TCI state pools may be indicated by the base station to the UE through RRC signaling. For example, multiple RRC message may be used, with one RRC message indicating a list of TCI-state IEs corresponding to the possible DL TCI states and joint DL/UL TCI states, and another RRC message indicating a list of TCI-state IEs corresponding to the possible UL TCI states. Each of the TCI-state IEs comprises a TCI state ID that identifies the corresponding TCI state. The existing UE-specific TCI states activation/deactivation MAC CE may be enhanced to map different TCI state to different TCI codepoint. FIG. 3D illustrates a diagram of another embodiment UE-specific TCI states activation/deactivation MAC CE 370 with DL TCI state(s) and joint DL/UL TCI state(s) from one TCI state pool and UL TCI state(s) from another TCI state pool. In this embodiment, since different TCI state may be from different TCI state pool, a TCI state pool ID is needed to indicate which TCI state pool a TCI state is from. As shown in FIG. 3D, the MSB of each octet except the first octet of the MAC CE is used to indicate whether the corresponding TCI state indicated in the octet is from the DL/joint TCI state pool or the UL TCI state pool. For example, a bit value of "1" indicates the TCI state is from DL/joint TCI state pool, while a bit value of "0" indicates the TCI state is from UL TCI state pool, or vice versa. As an example, the MSB of the second octet "Oct 2", bit "Co", is set to "1" to indicate that the TCI state indicated in "Oct 2" is from the DL/joint TCI state pool, and the TCI state is mapped to TCI codepoint 0. On the other hand, the MSB of the third octet "Oct 3", bit "R", is set to "0" to indicate that the TCI state indicated in "Oct 3" is from the UL TCI state pool, and the TCI state is mapped to TCI codepoint 1. As an example, if the size of the TCI field of the DCI message is 3 bits, there are a total of 8 TCI codepoints. Therefore one MAC CE can activate up to 8 TCI states, each of which is mapped to one of the 8 TCI codepoints. Some of these TCI states may be DL TCI state, some may be UL TCI state, and some may be joint DL/UL TCI state. The TCI field of the DCI message may then be used to indicate one TCI codepoint and its corresponding TCI state. The MSB of the first octet of the MAC CE, e.g., the "R" bit in octet "Oct 1", may be used to indicate CORESET pool ID or coresetPoolIndex for multiple DCI cases. For example, if this bit is set to "0", it indicates that the mapping between the TCI states(s) and the TCI codepoint(s) indicated in the MAC CE is specific to coresetPoolIndex 0. If this bit is set to "1", it indicates that the mapping between the TCI states(s) and the TCI codepoint(s) indicated in the MAC CE is specific to coresetPoolIndex 1.

Figure 3E:
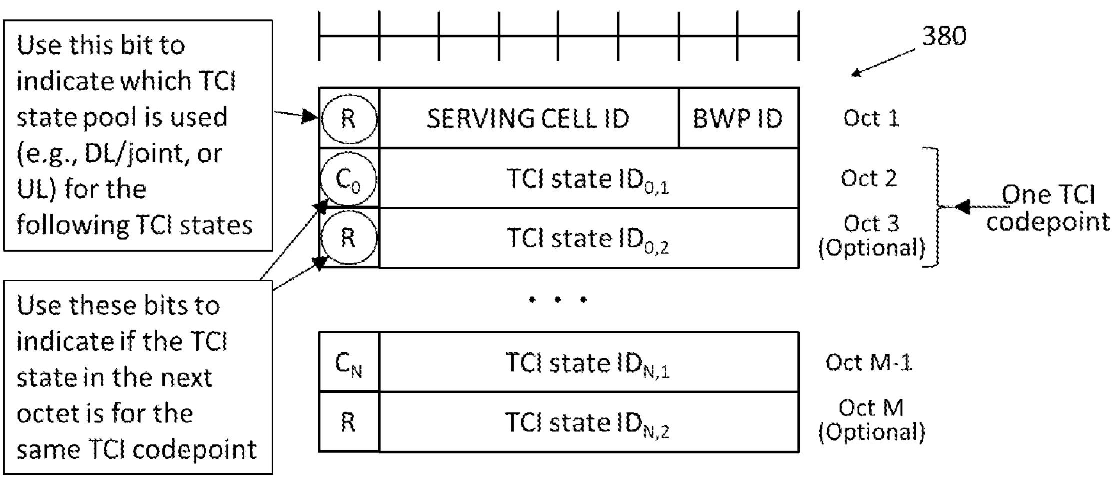
FIG. 3E illustrates a diagram of another embodiment UE-specific TCI states activation/deactivation MAC CE with DL TCI state(s) and joint DL/UL TCI state(s) from one TCI state pool, UL TCI state(s) from another TCI state pool, and multiple TCI states mapped to a TCI codepoint.

In another embodiment, existing UE-specific TCI states activation/deactivation MAC CE may be enhanced to map multiple DL TCI states, multiple UL TCI states, or multiple joint DL/UL TCI states to a TCI codepoint. In this embodiment, the DL TCI state(s), UL TCI state(s), and joint DL/UL TCI state(s) are from different TCI state pools. For example, the DL TCI states and joint DL/UL TCI states are from a DL/joint TCI state pool whereas the UL TCI states are from a UL TCI state pool. FIG. 3E illustrates a diagram of another embodiment UE-specific TCI states activation/deactivation MAC CE 380 with DL TCI state(s) and joint DL/UL TCI state(s) from one TCI state pool, UL TCI state(s) from another TCI state pool, and multiple TCI states mapped to a TCI codepoint. As shown in FIG. 3E, two TCI states are mapped to a TCI codepoint. The two TCI states may be DL TCI states, UL TCI states, or joint DL/UL TCI states. Other number of TCI states, for example, three TCI states, four TCI states, etc., are possible to be mapped to one TCI codepoint. As shown in FIG. 3E, the MSB of the first octet of the MAC CE, e.g., the "R" bit in octet "Oct 1", may be used to indicate which TCI state pool the TCI states indicated in the MAC CE are from. For example, a bit value of "1" indicates the TCI states are from DL/joint TCI state pool, while a bit value of "0" indicates the TCI states are from UL TCI state pool, or vice versa. As shown in FIG. 3E, the MSB of each of the octets except the first octet "Oct 1" is used to indicate whether the TCI state indicated in the next octet and the TCI state indicated in the current octet are mapped to the same TCI codepoint. For example, in octet "Oct 2", the MSB "Co" may be set to "1" to indicate that the TCI state indicated in the next octet "Oct 3", e.g., the one with TCI state ID0, 2, is mapped to the same TCI codepoint 0 as TCI state ID0, 1. And in octet "Oct 3", the MSB "R" may be set to "0" to indicate that the TCI state indicated in the next octet (the fourth octet), is mapped to a different TCI codepoint, e.g., TCI codepoint 1. On the other hand, if the MSB of octet "Oct 3" is set to "1", it indicates that the TCI state indicated in the next octet, the fourth octet, is still mapped to the same TCI codepoint 0 as TCI state ID0, 1 and TCI state ID0, 2. The MSB of the fourth octet may set to "0" to indicate that the TCI state indicated in the fifth octet is mapped to a different TCI codepoint, e.g., TCI codepoint 1. In this example, three TCI states are mapped to TCI codepoint 0. In fact, the MSB of an octet other than the first octet in the MAC CE may be used to indicate whether the TCI state indicated in the corresponding octet is the last TCI state mapped to a TCI codepoint. The MSB of an octet other than the first octet may then be used to identify the boundary of mappings for different TCI codepoints since a value of "0" of the MSB of an octet may indicate that the TCI state with the TCI state ID indicated in the octet is the last TCI state mapped to a TCI codepoint. The value of a TCI codepoint may then be decided in accordance with the order of the TCI codepoint in the MAC CE. For example, the first TCI codepoint in the MAC CE is of value 0, the second TCI codepoint in the MAC CE is of value 1, and so on.

Figure 3F:
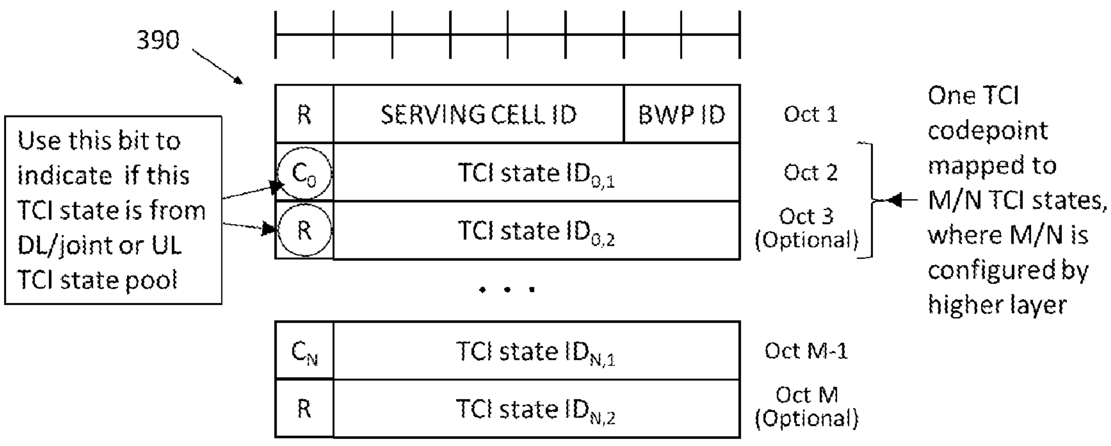
FIG. 3F illustrates a diagram of another embodiment UE-specific TCI states activation/deactivation MAC CE with DL TCI state(s) and joint DL/UL TCI state(s) from one TCI state pool, UL TCI state(s) from another TCI state pool, and multiple TCI states mapped to a TCI codepoint.

In yet another embodiment, existing UE-specific TCI states activation/deactivation MAC CE may be enhanced to map multiple TCI states to a TCI codepoint. In this embodiment, the DL TCI state(s), UL TCI state(s), and joint DL/UL TCI state(s) are from different TCI state pools. For example, the DL TCI states and joint DL/UL TCI states are from a DL/joint TCI state pool whereas the UL TCI states are from a UL TCI state pool. FIG. 3F illustrates a diagram of another embodiment UE-specific TCI states activation/deactivation MAC CE 390 with DL TCI state(s) and joint DL/UL TCI state(s) from one TCI state pool, UL TCI state(s) from another TCI state pool, and multiple TCI states mapped to a TCI codepoint. In this embodiment, the number of TCI states mapped to a single TCI codepoint may be higher layer configured, e.g., through RRC configuration. In FIG. 3F, the number of DL TCI states or joint DL/UL TCI states mapped to a single TCI codepoint is named "M" and the number of UL TCI states mapped to a single TCI codepoint is named "N". The value of M and N may be higher layer configured, e.g., through RRC configuration. In FIG. 3F, as an example, two TCI states are mapped to a single TCI codepoint. Other number of TCI states mapped to a single TCI codepoint is possible. The number of DL TCI states or joint DL/UL TCI states mapped to a single TCI codepoint and the number of UL TCI states mapped to a single TCI codepoint may be equal or may be different. For example, the value of M and N may be equal or may be different. In the example shown in FIG. 3F, the values of M and N are set to 2 as an example for illustration purpose. Other values, e.g., 3 and 4, etc., are possible. In this embodiment, since different TCI state may be from different TCI state pool, a TCI state pool ID is needed to indicate which TCI state pool a TCI state is from. As shown in FIG. 3F, the MSB of each octet except the first octet of the MAC CE is used to indicate whether the corresponding TCI state indicated in the octet is from the DL/joint TCI state pool or the UL TCI state pool. For example, a bit value of "1" indicates the TCI state is from DL/joint TCI state pool, while a bit value of "0" indicates the TCI state is from UL TCI state pool, or vice versa. As an example, the MSB of the second octet "Oct 2", e.g., bit "Co" is set to "1" to indicate that the TCI state indicated in "Oct 2" is from the DL/joint TCI state pool, and the TCI state is mapped to TCI codepoint 0. The MSB of the third octet "Oct 3", e.g., bit "R" is also set to "1" to indicate that the TCI state indicated in "Oct 3" is also from the DL/joint TCI state pool, and the corresponding TCI state is mapped to TCI codepoint 0 as well. In another example, the MSB of the second octet "Oct 2", e.g., bit "Co" is set to "0" to indicate that the TCI state indicated in "Oct 2" is from the UL TCI state pool, and the TCI state is mapped to TCI codepoint 0. The MSB of the third octet "Oct 3", e.g., bit "R" is also set to "0" to indicate that the TCI state indicated in "Oct 3" is also from the UL TCI state pool, and the corresponding TCI state is mapped to TCI codepoint 0 as well. In yet another example, the MSB of the second octet "Oct 2", e.g., bit "Co" is set to "1" to indicate that the TCI state indicated in "Oct 2" is from the DL/joint TCI state pool, and the TCI state is mapped to TCI codepoint 0. On the other hand, the MSB of the third octet "Oct 3", e.g., bit "R" is set to "0" to indicate that the TCI state indicated in "Oct 3" is from the UL TCI state pool, and the corresponding TCI state is also mapped to TCI codepoint 0. In this example, two TCI states are mapped to one TCI codepoint, one is DL TCI state and another is UL TCI state. The TCI field of the DCI message may then be used to indicate both a DL TCI state and a UL TCI state in one instance of DCI using the corresponding TCI codepoint. The MSB of the first octet of the MAC CE, e.g., the "R" bit in octet "Oct 1", may be used to indicate CORESET pool ID or coresetPoolIndex for multiple DCI cases. For example, if this bit is set to "0", it indicates that the mapping between the TCI states(s) and the TCI codepoint(s) indicated in the MAC CE is specific to coresetPoolIndex 0. If this bit is set to "1", it indicates that the mapping between the TCI states(s) and the TCI codepoint(s) indicated in the MAC CE is specific to coresetPoolIndex 1. In this embodiment, one MAC CE may activate multiple TCI states, and M (or N) TCI states are mapped to one of a plurality of TCI codepoints. Some of these TCI states may be DL TCI states, some may be UL TCI states, and some may be joint DL/UL TCI states. The TCI field in the DCI message may then be used to indicate one TCI codepoint and its corresponding multiple TCI states.

Figure 3G:
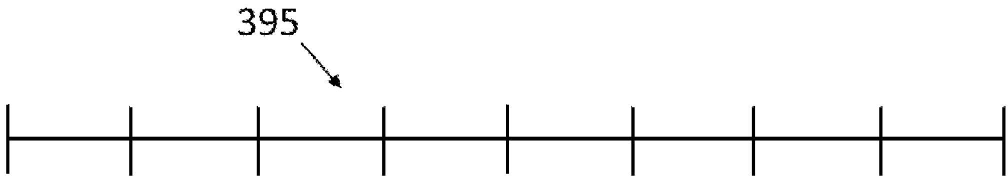
FIG. 3G illustrates a diagram of another embodiment UE-specific TCI states activation/deactivation MAC CE with "Additional Cell ID"

In yet another embodiment, for the scenarios with inter-cell multiple TRPs (M-TRPs) and/or L1/L2 inter-cell mobility, additional cell IDs are introduced. In these scenarios, on a carrier, in addition to the serving cell configured for a UE, there is another cell that the UE is also connected to or being served by. This may be seen as an extension of intra-cell M-TRPs in which a non-standalone TRP assists the serving cell. By non-standalone TRP, it refers to a TRP without physical cell identity (PCI) configured. Different from the intra-cell M-TRPs scenarios, in the inter-cell M-TRP scenarios, the assisting TRP may be a (standalone) cell with a PCI and SSB(s). The (standalone) cell may be called "additional cell", "assisting cell", "transmitting-receiving cell", or sometimes "non-serving cell". As the additional cell has a PCI, its resources/signals may not need to be differentiated from the serving cell's resources/signals via CORESET Pool IDs. The PCI of the additional cell may be referred to as additional PCI. In an embodiment, the CORESET Pool IDs are used to differentiate intra-cell M-TRPs whereas in the cases where inter-cell M-TRPs may also exist, the inter-cell M-TRPs are differentiated by their PCIs or the equivalent. In an embodiment, a plurality of the additional PCIs are associated with a plurality of IDs called "Additional Cell IDs" in a one-to-one association way, where one "additional PCI" is associated with one "Additional Cell ID". A UE may aggregate up to 32 serving cells on up to 32 carriers, and on each carrier, there may be an "additional cell", so there may be a total of 32 "additional cells" and the Additional Cell IDs may range from 0~31. To prevent high UE complexity, the total number of additional cells may be limited by a number smaller than 32, e.g., 8 or 16. The Additional Cell IDs may be used in configuration/MAC signaling. FIG. 3G illustrates a diagram of another embodiment UE-specific TCI states activation/deactivation MAC CE 395 with "Additional Cell ID". As shown in FIG. 3G, the size of the "Additional Cell ID" is 5 bits, which may be used to identify up to 32 "additional cells". If the total number of "additional cells" is limited to lower than 32, e.g., 8, fewer bits for "Additional Cell ID" may be needed for the MAC CE design shown in FIG. 3G. For example, if the total number of "additional cells" is limited to 8, only 3 bits are needed for the "Additional Cell ID" and 2 bits can be saved. The saved bits may be reserved or used to indicate other information, such as joint TCI or UL/DL TCI, etc. The embodiment of using Additional Cell IDs may be combined with other embodiments.

For the aforementioned embodiments, the UE, after receiving the MAC CE from the base station, may derive the mapping between the TCI state(s) and the TCI codepoint(s). The UE, after receiving the DCI message with TCI field, may then derive the TCI state(s) in accordance with the TCI codepoint(s) and the mapping between the TCI state(s) and the TCI codepoint(s). The UE may then determine a plurality of spatial filter information and/or a QCL-TypeD information for DL reception and UL transmission, depending on the TCI state(s) indicated in the DCI message. If the TCI state indicated in the DCI message is DL TCI state, the UE may determine a spatial filter information and/or a QCL-TypeD information for DL reception in accordance with the TCI state. If the TCI state indicated in the DCI message is UL TCI state, the UE may determine a spatial filter information and/or a QCL-TypeD information for UL transmission in accordance with the TCI state. If the TCI state indicated in the DCI message is joint DL/UL TCI state, the UE may determine a spatial filter information and/or a QCL-TypeD information for DL reception as well as a spatial filter information and/or a QCL-TypeD information for UL transmission in accordance with the TCI state. If the TCI states indicated in the DCI message are multiple DL TCI states, the UE may determine multiple spatial filter information and/or multiple QCL-TypeD information for DL reception in accordance with the multiple TCI states. For support of CORESET beam diversity, each of the multiple spatial filter information and/or multiple QCL-TypeD information may be used for DL reception of a CORESET or a subset of CORESETs. The spatial filter information and/or QCL-TypeD information used for DL reception of PDSCH may be set to the one determined in accordance with the first of the multiple TCI states. For support of multiple TRP, each of the multiple spatial filter information and/or multiple QCL-TypeD information may be used for DL reception for a TRP. If the TCI states indicated in the DCI message are multiple UL TCI states, the UE may determine multiple spatial filter information and/or multiple QCL-TypeD information for UL transmission in accordance with the multiple TCI states. If the TCI states indicated in the DCI message are multiple joint DL/UL TCI states, the UE may determine multiple spatial filter information and/or multiple QCL-TypeD information for DL reception as well as multiple spatial filter information and/or multiple QCL-TypeD information for UL transmission in accordance with the multiple TCI states. If the TCI states indicated in the DCI message includes both a DL TCI state and a UL TCI state, the UE may determine a spatial filter information and/or a QCL-TypeD information for DL reception in accordance with the DL TCI state as well as a spatial filter information and/or a QCL-TypeD information for UL transmission in accordance with the UL TCI state.

In the previous discussions the focus is mainly on common beam indication across multiple channels, the concept of grouping can be extended to scenarios where a common beam is used for communications across multiple component carriers, and scenarios where a common beam is used for communications with a group of UEs (e.g., a group of UEs in the same bus). In the scenario where a common beam is used for communications across multiple component carriers, a group comprises a plurality of component carriers as its members or elements. In the scenario where a common beam is used for communication with multiple UEs, a group comprises a plurality of UEs as its members or elements.

In one embodiment, the group configuration information in the first control message may comprise one or more group information, where a group information comprises a group identification (ID) or a group index that identifies the group, and indication of members or elements of the group. In this example, component carriers (CCs) are elements/members of the group and the indication of members of the group may be a list of component carriers. The indication of members of the group may also be a bitmap, with each bit in the bitmap corresponding to a component carrier. A bit set to one indicates that the corresponding component carrier is a member of the group, while a bit set to zero indicates that the corresponding component carrier is a not a member of the group. Other bitmap settings are possible, e.g., a bit set to zero indicates that the corresponding component carrier is a member of the group, while a bit set to one indicates that the corresponding component carrier is a not a member of the group.

Component carrier within the same group share the same beam. For example, the UE may assume that a spatial filter determined in accordance with a source reference signal may be used for operation on the multiple component carrier within the same group. The source reference signal may be viewed as being associated with a beam, being a reference to a beam, being associated with a QCL-TypeD property, being a reference to a QCL-TypeD property, being associated with a spatial filter, and/or being a reference to a spatial filter.

Similar to common beam indication for multiple channel case, after the base station transmits to the UE the first control message indicating the group configuration information, the base station transmits to the UE a second control message for common beam indication/updating/switching for multiple component carriers. The second control message comprises a plurality of TCI fields indicating a plurality of common beam(s) the UE should use for communication with the base station. The second control message also comprises indication of the group to which the plurality of common beam(s) should be applied. Hence the second control message comprises both the information of the source reference signal(s) indicating the common beam(s) and indicator indicating the target component carrier(s) that the common beam(s) should be applied to.

The UE, upon receiving the second control message with common beam indication/updating/switching, may determine the plurality of common beam(s) in accordance with the information of the source reference signal(s). For example, the UE may determine a spatial filter information and/or a QCL-TypeD information. The spatial filter information may be a spatial filter parameter, and the QCL-TypeD information may be a QCL-TypeD property which is a spatial domain QCL property. The UE may determine the target component carrier(s) in accordance with the indication of the group. The UE may then operate on the target component carrier(s) using the spatial filter information and/or the QCL-TypeD information.

In another embodiment, the group configuration information in the first control message may comprise one or more group information, where a group information comprises a group identification (ID) or a group index that identifies the group, and indication of members or elements of the group. In this example, UEs are elements/members of the group and the indication of members of the group may be a list of UEs. The indication of members of the group may also be a bitmap, with each bit in the bitmap corresponding to a UE. A bit set to one indicates that the corresponding UE is a member of the group, while a bit set to zero indicates that the corresponding UE is a not a member of the group. Other bitmap settings are possible, e.g., a bit set to zero indicates that the corresponding UE is a member of the group, while a bit set to one indicates that the corresponding UE is a not a member of the group.

UEs within the same group may share the same DL transmit beam from the base station. Similar to common beam indication for multiple channel case, after the base station transmits to the UE the first control message indicating the group configuration information, the base station transmits to the group of UEs a second control message for common beam indication/updating/switching for multiple UEs. The second control message comprises a plurality of indicators indicating a plurality of common beam(s) the group of UEs should use for communication with the base station. The second control message also comprises indication of the group to which the plurality of common beam(s) should be applied. Hence the second control message comprises both the information of the source reference signal(s) indicating the common beam(s) and indicator indicating the target UE(s) that the common beam(s) should be applied to.

The UE, upon receiving the second control message with common beam indication/updating/switching, may determine whether it belongs to the group in accordance with the indication of the group. Upon determining that it belongs to the group, the UE may determine the plurality of common beam(s) in accordance with the information of the source reference signal(s). For example, the UE may determine a spatial filter information and/or a QCL-TypeD information. The spatial filter information may be a spatial filter parameter, and the QCL-TypeD information may be a QCL-TypeD property which is a spatial domain QCL property. The UE may then communicate with the base station using the spatial filter information and/or the QCL-TypeD information.

In yet another embodiment, the group configuration information in the first control message may comprise multiple group information, where a group information comprises a group identification (ID) or a group index that identifies the group, and indication of members or elements of the group. In this example, information of different types of groups may be indicated in the group configuration information. For example, a first group may comprise one or more channels, a second group may comprise one or more component carriers, and a third group may comprise one or more UEs, etc. The elements/members of different group may be different. A joint group may be determined in accordance with the information of the multiple groups. For example, if two groups are configured, and the first group comprises {PDSCH, PDCCH, CSI-RS, PUSCH, PUCCH, SRS}, and the second group comprises {CC1, CC2}, then the joint group may be the channels {PDSCH, PDCCH, CSI-RS, PUSCH, PUCCH, SRS} on both CC1 and CC2. In another example, if three groups are configured, and the first group comprises {PDSCH, PDCCH, CSI-RS}, the second group comprises {CC1, CC2, CC3}, and the third group comprises {UE1, UE2, UE3}, then the joint group may be the channels {PDSCH, PDCCH, CSI-RS} on CC1, CC2, and CC3 for UE1, UE2, and UE3.

Elements/members within the joint group share the same beam. After the base station transmits to the UE the first control message indicating the group configuration information, the base station transmits to the UE a second control message for common beam indication/updating/switching. The second control message comprises a plurality of indicators indicating a plurality of common beam(s) the UE should use for communication with the base station. The second control message also comprises indication of the joint group to which the plurality of common beam(s) should be applied. The indication of the joint group may be in the form of a combination of the group IDs of the groups that form the joint group. Hence the second control message comprises both the information of the source reference signal(s) indicating the common beam(s) and indicator indicating the target element(s) that the common beam(s) should be applied to.

The UE, upon receiving the second control message with common beam indication/updating/switching, may determine the target elements in accordance with the indication of the joint group. The UE may determine the plurality of common beam(s) in accordance with the information of the source reference signal(s). For example, the UE may determine a spatial filter information and/or a QCL-TypeD information. The spatial filter information may be a spatial filter parameter, and the QCL-TypeD information may be a QCL-TypeD property which is a spatial domain QCL property. The UE may then operate on the target element(s) using the spatial filter information and/or the QCL-TypeD information.

Therefore the aforementioned embodiments provide methods for common beam indication for multiple elements such as multiple channels, multiple component carriers, and multiple UEs, etc. in one layer-1 (L1) or layer-2 (L2) control message, therefore reducing latency and overhead for common beam indication and updating/switching.

In one embodiment, overhead may be further reduced by removing the first control message. In this embodiment, the base station does not transmit the first control message to the UE. The group configuration information is indicated in the second control message. For example, the second control message comprises a bitmap indicating the group configuration information, with each bit in the bitmap corresponding to a member/element of the group. A bit set to one indicates that the corresponding member/element is a member of the group, while a bit set to zero indicates that the corresponding member/element is a not a member of the group. Other bitmap settings are possible, e.g., a bit set to zero indicates that the corresponding member/element is a member of the group, while a bit set to one indicates that the corresponding member/element is a not a member of the group. The mapping between each bit of the bitmap and member/element of the group may be predefined, e.g., in a standard, specified by the operator of the communication system, etc., and are known to both the base station and the UE.

As discussed previously, the information of the source reference signal may be indicated in a TCI state, and a TCI state comprising indication of a source reference signal may serve the purpose of beam indication. According to 3GPP TS 38.331 V16.1.0 (2020-07), a TCI state is configured by the TCI-State information element (IE), which is part of a RRC signaling. The fields included in the TCI-State IE is illustrated in Table 1 below:

TABLE 1

TCI-State IE

```
-- ASN1START
-- TAG-TCI-STATE-START
TCI-State ::=          SEQUENCE {
   tci-StateId            TCI-StateId,
   qcl-Type1                QCL-Info,
   qcl-Type2                   QCL-Info             OPTIONAL, -- Need R
   ...
}
QCL-Info ::=              SEQUENCE
   cell              ServCellIndex              OPTIONAL, -- Need R
   bwp-Id            BWP-Id                 OPTIONAL, -- Cond CSI-RS-Indicated
   referenceSignal             CHOICE {
      csi-rs            NZP-CSI-RS-ResourceId,
      ssb               SSB-Index,
   },
   qcl-Type          ENUMERATED {typeA, typeB, typeC, typeD},
   ...
}
-- TAG-TCI-STATE-STOP
```

Figure 4:
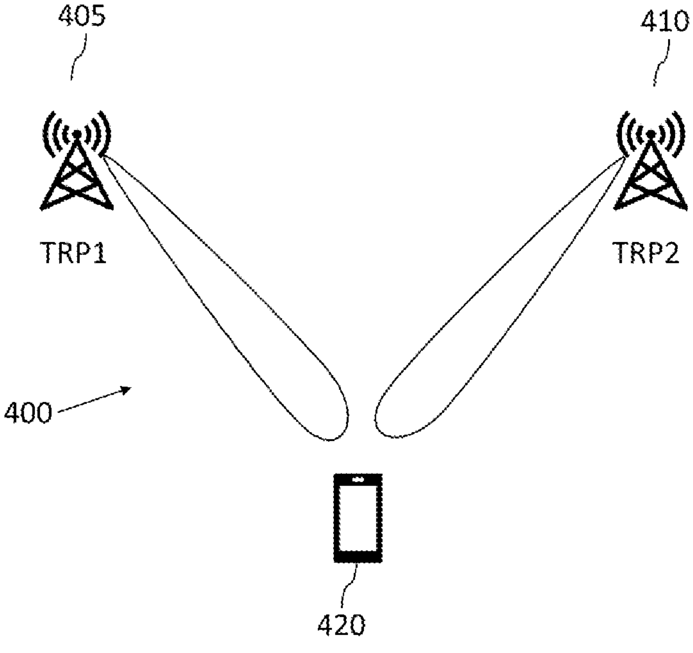
FIG. 4 illustrates a diagram of an embodiment communication system with multi-TRP communication.

ASN1STOPIn some deployment scenarios, a UE may communicate with multiple TRPs. FIG. 4 illustrates a diagram of an embodiment communication system 400 with multi-TRP communication. The communications system 400 includes a plurality of TRPs, e.g., a first TRP 405, and a second TRP 410 communicating with a UE 420. As shown in FIG. 4, both TRP 405 and TRP 410 communicate with UE 420 using beamformed transmissions and receptions.

According to 3GPP TS 38.214 V16.2.0 (2020-06), group-based reporting is supported when the UE is configured with the higher layer parameter groupBasedBeamReporting set to 'enabled'. In this case, the UE reports in a single reporting instance two different CSI-RS resource indicator (CRI) or SSB resource indicator (SSBRI) for each report setting, where the CSI-RS and/or SSB resources can be received simultaneously by the UE. The supported report quantities for group-based reporting are 'cri-RSRP', 'ssb-Index-RSRP', 'cri-SINR', and 'ssb-Index-SINR'.

However, in 3GPP Rel. 15/16, which is hereby incorporated herein by reference, there is no TRP identification associated with different CSI-RS and/or SSB resources. When the UE performs measurements on the CSI-RS and/or SSB resource, it cannot determine whether two CSI-RS/SSBs are from the same TRP or from two different TRPs. Therefore it is possible that when the UE reports two different CRI or SSBRI (e.g., beams) in group-based reporting, the two different beams are from the same TRP. When this occurs, the gNB and the UE cannot take advantage of simultaneous multi-TRP transmission with multi-panel reception to improve user throughput or reliability of the transmission since it is not feasible for a single TRP to transmit multiple beams simultaneously in frequency range 2 (FR2) (e.g., mmWave). To support simultaneous multi-TRP transmission with multi-panel reception, enhancements are needed such that the UE only selects beams from different TRPs for pairing in group-based reporting.

One approach to enabling inter-TRP beam pairing is to apply restriction to the two CRI or SSBRI reported in the reporting instance such that each CRI or SSBRI is from a different TRP. To achieve this, TRP identification is needed. In one embodiment, a groupID field may be indicated in the TCI-state information element. The groupID field serves as a TRP identification. An example of how to enhance the TCI-State IE to include the groupID field is illustrated in Table 2 below. In Table 2, the underlined parts are the enhancements to the TCI-state information element. Descriptions of each of the enhancement are provided below:

physCellId: this is the physical cell identity (PCI) of the serving cell or non-serving cell. With the PCI info added to the TCI state, the TCI states of non-serving cell can also be configured for the UE, which could enable the UE with faster candidate beam identification and beam failure recovery (BFR) utilizing the non-serving cell's beams.

groupID: in multiple TRP case, this ID serve as the TRP identification. With this ID, the UE may, for example, identify the TRP source of the source reference signal. The UE may then avoid reporting multiple beams from the same TRP to facilitate inter-TRP beam pairing, considering the fact that it is not feasible for one TRP to transmit multiple beams simultaneously in FR2.

srs: this is the SRS resource identification. SRS may serve as source reference signal in beam indication.

Other parameters: the other parameters include UL-related parameters (e.g., power control related parameters such as path loss (PL) RS and Po/alpha, and UL-timing related parameters) which are necessary for the UE to perform UL communication.

These other parameters may be included in the TCI-state IE and indicated to the UE such that the UE can perform UL communication in accordance with these parameters.

TABLE 2

Example of enhanced TCI-State IE

```
-- ASN1START
-- TAG-TCI-STATE-START
TCI-State ::=              SEQUENCE {
  tci-StateId                TCI-StateId,
  qcl-Type1                  QCL-Info,
  qcl-Type2                    QCL-Info              OPTIONAL, -- Need R
  ...
}
QCL-Info ::=                 SEQUENCE
  cell                     ServCellIndex             OPTIONAL, -- Need R
  physCellId                   PhysCellId                OPTIONAL,
  groupId                    GroupId                 OPTIONAL,
  bwp-Id                     BWP-Id                  OPTIONAL, --
Cond CSI-RS-Indicated
  referenceSignal                CHOICE {
    csi-rs                   NZP-CSI-RS-ResourceId,
    ssb                      SSB-Index,
    srs                      SRS-ResourceId
  },
  qcl-Type                   ENUMERATED {typeA, typeB, typeC, typeD},
  ...
}
-- TAG-TCI-STATE-STOP
-- ASN1STOP
```

Another scenario where the TRP identification may be beneficial is beam failure recovery (BFR) in multiple TRPs case. In 3GPP Rel. 15/16, the UE monitors periodic CSI-RS that are QCLed with PDCCH DMRS with respect to 'QCL-TypeD' for beam failure detection purpose. These periodic CSI-RS are referred as beam failure detection reference signals (BFD-RS). There could be multiple BFD-RS corresponding to multiple CORESETs. The UE monitors the quality of the BFD-RS and derives hypothetical PDCCH BLER. When a hypothetical PDCCH BLER is higher than a threshold for a number of consecutive instances, the corresponding BFD-RS is viewed as failed. A BFR is triggered only when all the BFD-RS fail.

It is important to support multiple TCI states such that each of the TCI states provide QCL information for UE-dedicated reception on a subset of CORESETs in a component carrier. That way, the QCL relationship between BFD-RS and CORESET can be defined as in Rel. 15/16 where the BFD-RS are QCLed with PDCCH DMRS with respect to 'QCL-TypeD'. However, if only one TCI state is supported at one time and the TCI state provide QCL information for UE-dedicated reception on all of CORESETs in a component carrier, then it is difficult to define the QCL relationship between BFD-RS and CORESET since there is only one beam available for all the CORESETs.

In one embodiment, the multiple TCI states, each of which provides QCL information for UE-dedicated reception on a subset of CORESETs, is supported as follows. When a UE receives a DCI for DL beam indication, the source reference signal(s) in the DL TCI state(s) provide QCL information for UE-dedicated reception on PDSCH and for UE-dedicated reception on the associated CORESET (e.g., the CORESET that the DCI is carried on). This way, after the UE receives multiple DCIs over multiple CORESETs for DL beam indications, the UE will have information on the multiple DL TCIs for the multiple CORESETs. The TCI state(s) for the PDSCH, on the contrast, just follows the one(s) indicated in the DCI, without being expanded by the TCI states for the multiple CORESETs.

In another embodiment, when a UE receives a DCI for DL beam indication, one TCI codepoint in the DCI TCI field may indicate multiple TCI states. The mapping of multiple TCI states to one TCI codepoint may be indicated by the base station through MAC CE. All the CORESETs may be divided into multiple CORESET groups, each CORESET group comprises a subset of the CORESETs. The configuration information of the CORESET groups may be indicated by the base station through RRC. Each of the multiple TCI states indicated by the DCI is associated with a CORESET group. The source reference signal(s) in each of the DL TCI states provide QCL information for UE-dedicated reception on PDSCH and for UE-dedicated reception on all the CORESET(s) in the associated CORESET group (e.g., the CORESET group associated with the TCI state). This way, after the UE receives a DCI indicating multiple DL TCI states, the UE will have information on the multiple DL TCI states for the multiple CORESET groups. For example, all the CORESETs may be divided into two CORESET groups. Each CORESET group is identified with a different coresetPoolIndex value, with coresetPoolIndex 0 indicating the first CORESET group and coresetPoolIndex 1 indicating the second CORESET group. Furthermore, one TCI codepoint in the DCI TCI field indicate two TCI states. In one alternative, the first TCI state is associated with the first CORESET group and the second TCI state is associated with the second CORESET group. When a UE receives a DCI for DL beam indication, the source reference signal(s) in the first TCI state indicated by the TCI field provide QCL information for UE-dedicated reception on PDSCH and for UE-dedicated reception on the first CORESET group. The source reference signal(s) in the second TCI state indicated by the TCI field provide QCL information for UE-dedicated reception on PDSCH and for UE-dedicated reception on the second CORESET group. In another alternative, the first TCI state is associated with the CORESET group of the CORESET where the DCI is received and detected by the UE, and the second TCI state is associated with the other CORESET group. When a UE receives a DCI for DL beam indication, the source reference signal(s) in the first TCI state indicated by the TCI field provide QCL information for UE-dedicated reception on PDSCH and for UE-dedicated reception on the CORESET group of the CORESET where the DCI is received and detected. The source reference signal(s) in the second TCI state indicated by the TCI field provide QCL information for UE-dedicated reception on PDSCH and for UE-dedicated reception on the other CORESET group. After the UE receives the DCI indicating two DL TCI states, the UE can then have information on the two DL TCI states for the two CORESET groups. In the example above, two CORESET groups are used as an example. Other values (e.g., 3, 4, and 5, etc.) for the number of CORESET groups are also possible.

In yet another embodiment, when a UE receives multiple DCIs for DL beam indication, each of the DCI TCI fields indicate one TCI state. Thus the multiple DCIs indicate multiple TCI states. All the CORESETs may be divided into multiple CORESET groups, each CORESET group comprises a subset of the CORESETs. The configuration information of the CORESET groups may be indicated by the base station through RRC. Each of the multiple TCI states indicated by the multiple DCIs is associated with a CORESET group. The source reference signal(s) in each of the DL TCI states provide QCL information for UE-dedicated reception on PDSCH and for UE-dedicated reception on all the CORESET(s) in the associated CORESET group (e.g., the CORESET group associated with the TCI state). This way, after the UE receives multiple DCIs indicating multiple DL TCI states, the UE will have information on the multiple DL TCI states for the multiple CORESET groups. For example, all the CORESETs may be divided into two CORESET groups. Each CORESET group is identified with a different coresetPoolIndex value, with coresetPoolIndex 0 indicating the first CORESET group and coresetPoolIndex 1 indicating the second CORESET group. Furthermore, the UE receives two DCIs indicating two TCI states. In one alternative, the first TCI state indicated by the first DCI is associated with the first CORESET group and the second TCI state indicated by the second DCI is associated with the second CORESET group. When a UE receives two DCIs for DL beam indication, the source reference signal(s) in the first TCI state indicated by the first DCI provide QCL information for UE-dedicated reception on a first PDSCH and for UE-dedicated reception on the first CORESET group. The source reference signal(s) in the second TCI state indicated by the second DCI provide QCL information for UE-dedicated reception on a second PDSCH and for UE-dedicated reception on the second CORESET group. In another alternative, the first TCI state indicated by the first DCI is associated with the CORESET group of the CORESET where the first DCI is received and detected, and the second TCI state indicated by the second DCI is associated with the CORESET group of the CORESET where the second DCI is received and detected. When a UE receives two DCIs for DL beam indication, the source reference signal(s) in the first TCI state indicated by the first DCI provide QCL information for UE-dedicated reception on a first PDSCH and for UE-dedicated reception on the CORESET group of the CORESET where the first DCI is received and detected. The source reference signal(s) in the second TCI state indicated by the second DCI provide QCL information for UE-dedicated reception on a second PDSCH and for UE-dedicated reception on the CORESET group of the CORESET where the second DCI is received and detected. After the UE receives the two DCIs indicating the two DL TCI states, the UE can then have information on the two DL TCI states for the two CORESET groups. In the example above, two CORESET groups are used as an example. Other values (e.g., 3, 4, and 5, etc.) for the number of CORESET groups are also possible.

In multiple TRP cases, the UE may be connected with multiple TRPs. Due to reasons such as blocking, it is possible that while all the beam(s) (e.g., BFD-RS) between the UE and one TRP fail, the beam(s) between the UE and the other TRP(s) are still working. With the 3GPP Rel. 15/16 BFR triggering mechanism, no beam failure can be declared as the beam failure declaration requires that all beams between the UE and all the connected TRPs fail. However, it would be beneficial if the UE can declare a per-TRP beam failure when all the beams to a connected TRP fail, instead of waiting till the time when all the beams to all the connected TRP(s) fail. When the UE declare a per-TRP beam failure for a specific TRP, it can trigger per-TRP BFR procedure for that TRP while the beam(s) to other TRP(s) are still working, thus minimizing interruption to the communication.

To support per-TRP BFR, it is important for the UE to identify the TRP sources of different BFD-RS. When all the BFD-RS from a TRP is detected as failed, the UE can then declare BF for that TRP and trigger per-TR BFR. As discussed previously, including TRP identification (e.g., groupID) to TCI-state IE can well serve this purpose.

In multiple TRP cases, the UE may communicate with multiple TRPs simultaneously. The communication between the UE and different TRP may use different beam, therefore it is necessary for the UE to support multiple simultaneous active TCI states, and it is also necessary for the base station or TRP(s) to indicate the multiple simultaneous TCI states to the UE. Particularly, it is necessary for the base station or TRP(s) to indicate multiple simultaneous common beams to the UE. In one embodiment, the base station or TRP(s) may indicate multiple TCI states in a control message. For example, the multiple TCI states may be indicated in the control message with multiple TCI fields, each TCI field indicating one TCI state, respectively. In one example, the control message may comprise indication of a group to which the multiple TCI states should be applied. In another example, the control message may comprise indication of multiple groups to which the multiple TCI states should be applied, respectively. This control message may be the second control message discussed previously, and may be a DCI message or a MAC CE. In another embodiment, the base station or TRP(s) may indicate multiple TCI states in multiple control messages, each TCI state being indicated in a control message, respectively. Each of the control messages may comprise indication of a group to which the TCI state indicated in the control message should be applied.

As discussed previously, a TCI state comprising indication of a source reference signal may be used for beam indication. All the TCI states that may be used for beam indication for DL channels for a UE form a DL TCI state pool for the UE. All the TCI states that may be used for beam indication for UL channels for the UE form a UL TCI state pool for the UE. The base station indicates the possible DL TCI states and UL TCI states to the UE through RRC signaling. For example, one RRC message may comprise a list of TCI-state IEs corresponding to the possible DL TCI states and UL TCI states. In another example, multiple RRC message may be used, with one RRC message indicating a list of TCI-state IEs corresponding to the possible DL TCI states and another RRC message indicating a list of TCI-state IEs corresponding to the possible UL TCI states.

Figure 5:
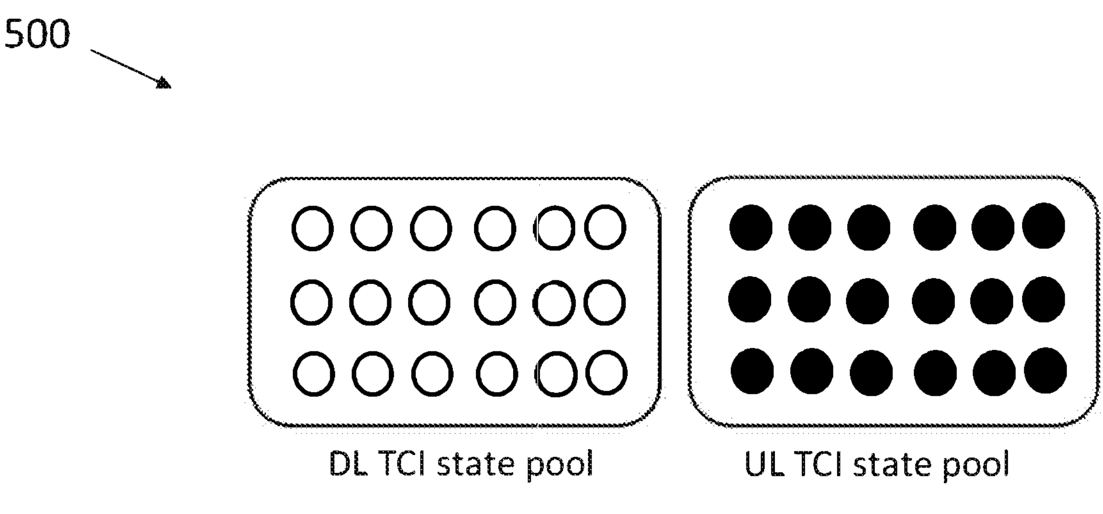
FIG. 5 illustrates a diagram of embodiment TCI state pools with separate DL and UL TCI state pool.

FIG. 5 illustrates a diagram of embodiment TCI state pools 500 with separate DL and UL TCI state pool. In FIG. 5, each circle represents a source reference signal in the TCI state pool. White circle indicates source reference signal for DL TCI state and black circle indicates source reference signal for UL TCI state.

Figure 6:
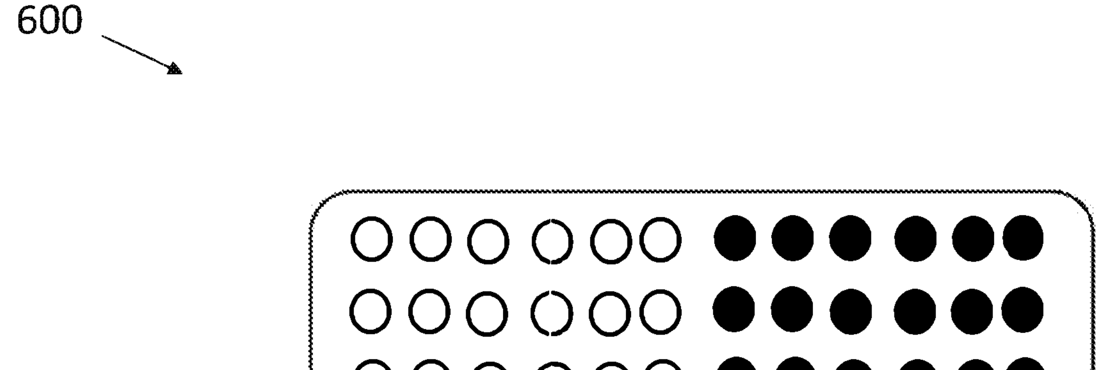
FIG. 6 illustrates a diagram of embodiment TCI state pool with joint DL and UL TCI state pool.

The DL TCI state pool and the UL TCI state pool may be jointed to form a joint TCI state pool. The TCI state that may be used for beam indication for DL channels and/or UL channels may be selected from this joint TCI state pool. FIG. 6 illustrates a diagram of embodiment TCI state pool 600 with joint DL and UL TCI state pool. In FIG. 6, each circle represents a source reference signal in the joint TCI state pool. White circle indicates source reference signal for DL TCI state and black circle indicates source reference signal for UL TCI state.

Figure 7:
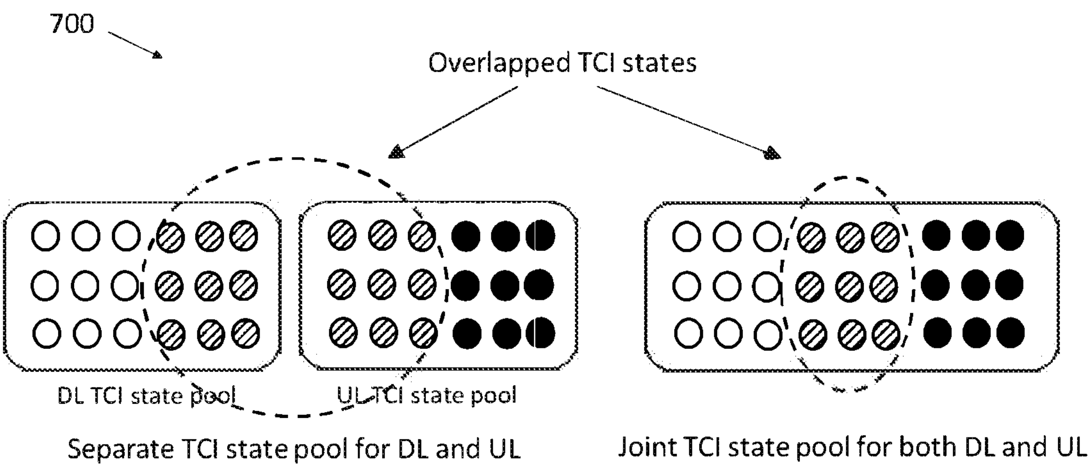
FIG. 7 illustrates a diagram of embodiment TCI state pools showing overlapped DL and UL TCI states.

It is possible that some source reference signals for some of the DL TCI states are the same as those for some of the UL TCI states. For example, a CSI-RS may be source reference signal for both a DL TCI state and a UL TCI state. In this case, there may be overlapped TCI states among the DL TCI states and the UL TCI states. FIG. 7 illustrates a diagram of embodiment TCI state pools 700 showing overlapped DL and UL TCI states. In FIG. 7, each circle represents a source reference signal in the joint TCI state pool. White circle indicates source reference signal for DL TCI state, black circle indicates source reference signal for UL TCI state, and shaded circle indicates source reference signal for overlapped DL and UL TC states.

As discussed previously, it is necessary for the base station to indicate to the UE some UL-related parameters (e.g., power control related parameters such as PL RS and Po/alpha, and UL-timing related parameters) such that the UE can perform UL transmission in accordance with these parameters. These UL-related parameters may be included in the TCI-state IE and indicated to the UE. Since the UE does not need these UL-related parameters for reception of DL channels, it is not necessary to include these UL-related parameters in DL TCI states. One benefit of not including these UL-related parameters in DL TCI states is that the size of the RRC message comprising the DL TCI-state IEs may be reduced. However, in scenarios where common beam indication is utilized for multiple channels across DL and UL, it is possible that a DL TCI state is used to indicate beam(s) for both the DL channels and the UL channels. It is therefore beneficial to provide methods for the UE to determine the UL-related parameters when a DL TCI state is used to indicate beam(s) for both the DL channels and the UL channels.

In one embodiment, the base station may indicate a mapping relation between a plurality of DL TCI states and a plurality of UL TCI states to the UE. Upon receiving indication of a DL TCI state in common beam indication, the UE may determine the corresponding UL TCI state(s) in accordance with the mapping relation. The UE may then determine the UL-related parameters in accordance with the UL TCI states. For example, the UE may determine the UL-related parameters from the UL TCI-state IE(s) that configure the UL TCI state(s). For illustration purpose, let's consider the following example. In this example, the base station first indicates to the UE a mapping relation that associate DL TCI state #1 with UL TCI state #6. The base station then indicates to the UE a common beam for a PDSCH and PUSCH using a DL TCI state #1. The UE, upon receiving the common beam indication, determines that the UL TCI state is #6 based on the mapping relation. The UE may then determine the UL-related parameters for PUSCH transmission from the UL TCI-state IE that configure UL TCI state #6.

In another embodiment, the base station does not need to indicate the mapping relation between the plurality of DL TCI states and the plurality of UL TCI states. The mapping relation may be determined based on the source reference signal in the TCI states. If a DL TCI state and a UL TCI state have the same source reference signal, the DL TCI state and the UL TCI state are associated/mapped together.

In one embodiment, a DL TCI state may be associated with multiple UL TCI states. This is useful in scenarios where a good DL receive beam/spatial filter may not be suitable for use by the UE as UL transmit beam/spatial filter for UL transmission due to the maximum permissible exposure (MPE) limits. In this embodiment, upon receiving indication of a DL TCI state for DL beam indication, the UE may determine the corresponding multiple UL TCI states in accordance with the mapping relation. The base station may then indicate an UL TCI state to the UE in a control message for UL beam indication, e.g., through a TCI field in a DCI message, wherein the UL TCI state is from the multiple UL TCI states associated with the DL TCI state. Since the number of UL TCI states associated with the DL TCI state may be much less than the total number of possible UL TCI states, the size of the TCI filed indicating the UL TCI state can then be reduced, resulting in less overhead.

Figure 8:
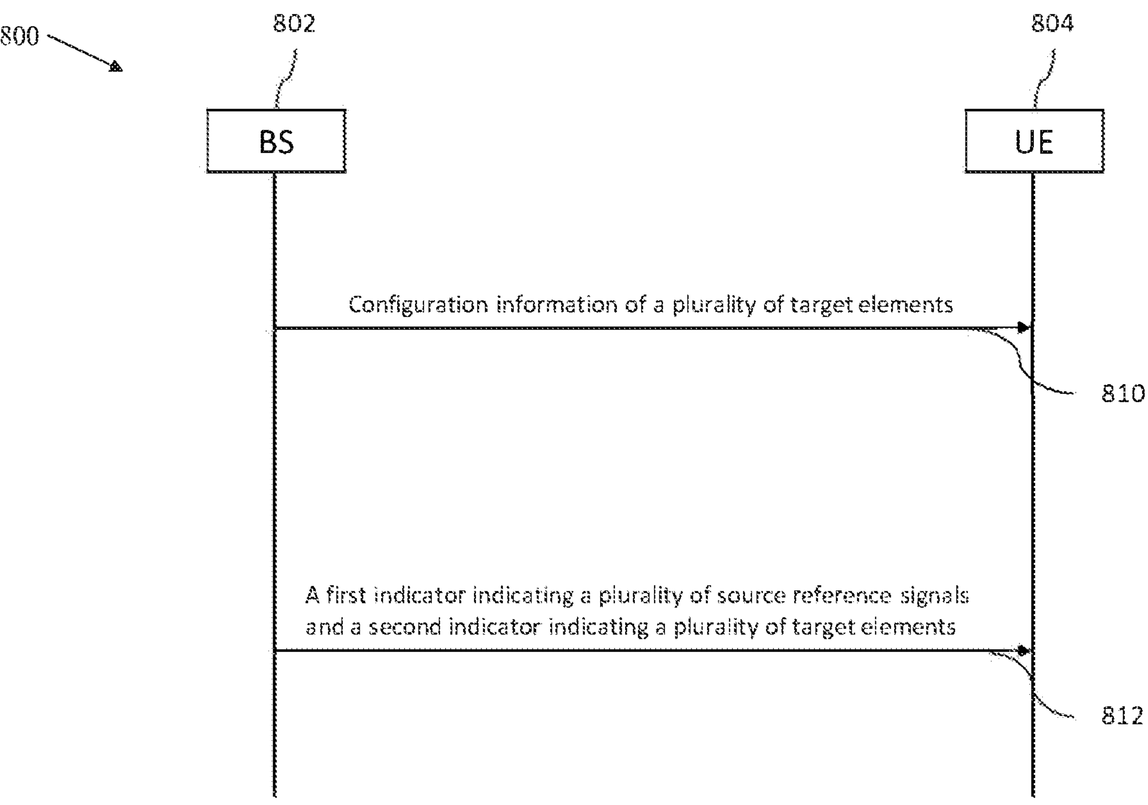
FIG. 8 illustrates a diagram of an embodiment method for enhanced common beam indication.

FIG. 8 illustrates a diagram of an embodiment method 800 for enhanced common beam indication. In this example, a base station 802 configures a group of elements and indicates common beam(s) applied to the group of elements for a UE 804, and the UE 804 determined QCL information and/or spatial filter information to operate on the group of elements. For example, the spatial filter information may be a spatial filter parameter, and the QCL information may be a QCL property such as QCL-TypeD which is a spatial domain QCL property. At step 810, the base station 802 transmits to the UE 804 a control message comprising configuration information of a plurality of target elements. The plurality of target elements may be multiple channels, multiple component carriers, multiple UEs, or a combination thereof. The plurality of target elements share a same beam. At step 812, the base station 802 transmits to the UE 804 another control message comprising a first indicator indicating a plurality of source reference signals and a second indicator indicating the plurality of target elements. The second indicator may be implicit, e.g., the second indicator may not be explicitly indicated. The plurality of source reference signals may be indicated in a plurality of TCI states. The control message at step 812 comprises both the information of the source reference signal(s) indicating the common beam(s) and indicator indicating the target element(s) that the common beam(s) should be applied to. The UE, upon receiving the control message sent at step 812, may then determine the plurality of common beam(s) in accordance with the information of the source reference signal(s).

Figure 9A:
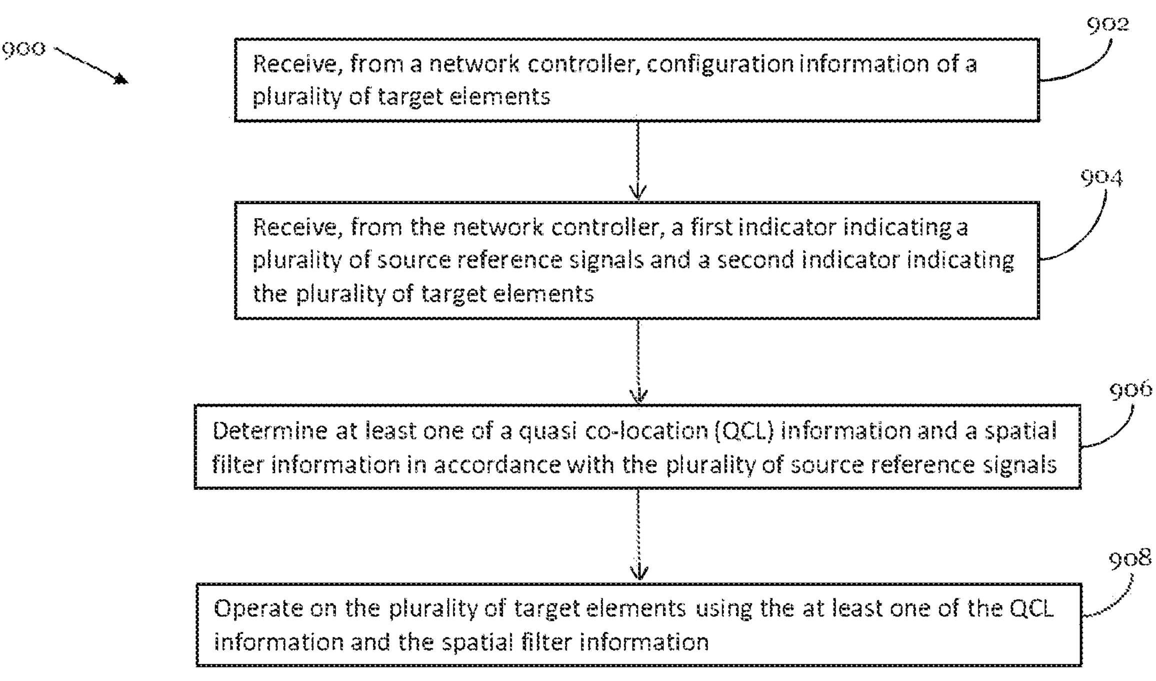
FIG. 9A illustrates a diagram of an embodiment method for wireless communication.

FIG. 9A illustrates a diagram of an embodiment method 900 for wireless communication. The method 900 may be performed by a communication device, such as a UE. At step 902, the communication device receives, from a network controller, such as an access node, or a base station, configuration information of a plurality of target elements. At step 904, the communication device receives, from the network controller, a first indicator indicating a plurality of source reference signals and a second indicator indicating the plurality of target elements. The second indicator may be implicit, e.g., the second indicator may not be explicitly indicated. At step 906, the communication device determines at least one of a QCL information and/or a spatial filter information in accordance with the plurality of source reference signals. For example, the spatial filter information may be a spatial filter parameter, and the QCL information may be a QCL property such as QCL-TypeD which is a spatial domain QCL property. At step 908, the communication device operates on the plurality of target elements using the at least one of the QCL information and/or the spatial filter information.

Figure 9B:
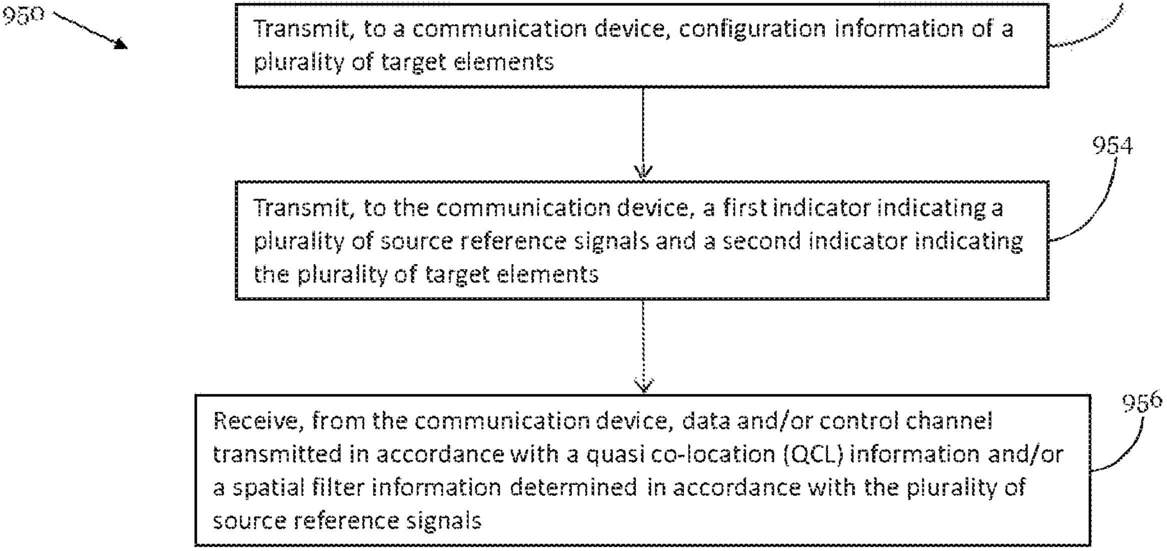
FIG. 9B illustrates a diagram of another embodiment method for wireless communication.

FIG. 9B illustrates a diagram of another embodiment method 950 for wireless communication. The method 950 may be performed by a network controller, such as an access node, or a base station. At step 952, the network controller transmits, to a communication device, configuration information of a plurality of target elements. At step 954, the network controller transmits, to the communication device, a first indicator indicating a plurality of source reference signals and a second indicator indicating the plurality of target elements. The second indicator may be implicit, e.g., the second indicator may not be explicitly indicated. At step 956, the network controller may receive, from the communication device, data and/or control channel transmitted in accordance with a quasi co-location (QCL) information and/or a spatial filter information determined in accordance with the plurality of source reference signals. The spatial filter information may be a spatial filter parameter, and the QCL-TypeD information may be a QCL-TypeD property which is a spatial domain QCL property.

Figure 10:
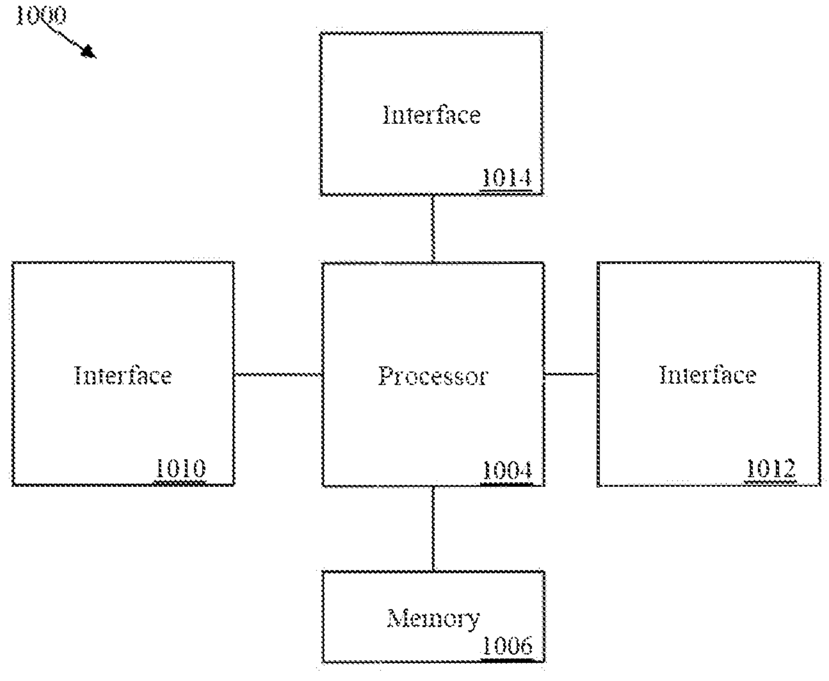
FIG. 10 illustrates a block diagram of an embodiment processing system.

FIG. 10 illustrates a block diagram of an embodiment processing system 1000 for performing methods described herein, which may be installed in a host device. As shown, the processing system 1000 includes a processor 1004, a memory 1006, and interfaces 1010-1014, which may (or may not) be arranged as shown in FIG. 10. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, 1014 may be any component or collection of components that allow the processing system 1000 to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in FIG. 10, such as long term storage (e.g., non-volatile memory, etc.).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
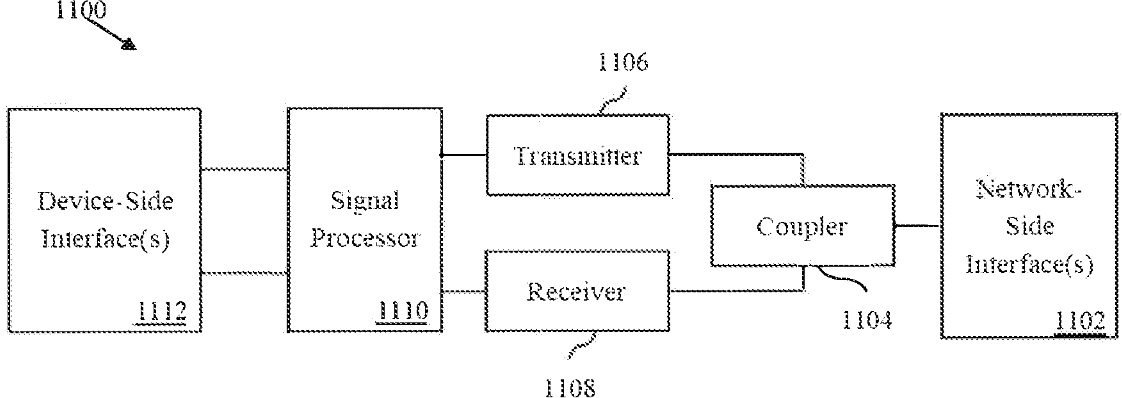
FIG. 11 illustrates a block diagram of an embodiment transceiver.

In some embodiments, one or more of the interfaces 1010, 1012, 1014 connects the processing system 1000 to a transceiver adapted to transmit and receive signaling over the telecommunications network. FIG. 11 illustrates a block diagram of a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 800, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method, comprising:

receiving, by a communication device from a network controller, a first control message comprising first indication information indicating a plurality of target channel elements or a plurality of target reference signals;

receiving, by the communication device from the network controller, a second control message comprising second indication information indicating a plurality of source reference signals;

determining, by the communication device, quasi co-location (QCL) information or spatial filter information in accordance with the plurality of source reference signals; and receiving or transmitting, by the communication device, the plurality of target reference signals or in the plurality of target channel elements using the QCL information or the spatial filter information.

2. The method of claim 1, wherein the first control message is a radio resource control (RRC) signaling.

3. The method of claim 1, wherein the receiving the second control message is after the receiving the first control message, and wherein the second control message is a downlink control information (DCI) message.

4. The method of claim 1, wherein the second indication information comprises a first plurality of TCI state indicators indicating a first plurality of transmission configuration indication (TCI) states, wherein the first plurality of TCI states indicates the plurality of source reference signals, and wherein the first plurality of TCI states are of a first set of TCI states, and wherein the first set of TCI states are for downlink (DL) communication.

5. The method of claim 1, wherein the plurality of target channel elements or the plurality of target reference signals use the QCL information or the spatial filter information from a reference signal.

6. A method, the method comprising:

transmitting, by a network controller to a communication device, a first control message comprising first indication information indicating a plurality of target channel elements or a plurality of target reference signals; and transmitting, by the network controller to the communication device, a second control message comprising second indication information indicating a plurality of source reference signals, wherein the plurality of source reference signals instructs the communication device to determine quasi co-location (QCL) information or spatial filter information in accordance with the plurality of source reference signals, and wherein the QCL information or the spatial filter information is used for receiving or transmitting the plurality of target reference signals or in the plurality of target channel elements.

7. The method of claim 6, wherein the transmitting the second control message is after the transmitting the first control message, wherein the first control message is a radio resource control (RRC) signaling, and wherein the second control message is a downlink control information (DCI) message.

8. The method of claim 6, wherein the second indication information comprises a first plurality of TCI state indicators indicating a first plurality of transmission configuration indication (TCI) states, wherein the first plurality of TCI states indicates the plurality of source reference signals, and wherein the first plurality of TCI states are of a first set of TCI states, and wherein the first set of TCI states are for downlink (DL) communication.

9. The method of claim 6, wherein the plurality of target channel elements or the plurality of target reference signals use the QCL information or the spatial filter information from a reference signal.

10. A user equipment (UE) comprising:

a non-transitory memory storage storing instructions; and one or more processors in communication with the non-transitory memory storage, wherein the one or more processors execute the instructions to cause the UE to perform operations including:

receiving, from a network controller, a first control message comprising first indication information indicating a plurality of target channel elements or a plurality of target reference signals;

receiving, from the network controller, a second control message comprising second indication information indicating a plurality of source reference signals;

determining quasi co-location (QCL) information or spatial filter information in accordance with the plurality of source reference signals; and receiving or transmitting the plurality of target reference signals or in the plurality of target channel elements using the QCL information or the spatial filter information.

11. The UE of claim 10, wherein the receiving the second control message is after the receiving the first control message, wherein the first control message is a radio resource control (RRC) signaling, and wherein the second control message is a downlink control information (DCI) message.

12. The UE of claim 10, wherein the second indication information comprises a first plurality of TCI state indicators indicating a first plurality of transmission configuration indication (TCI) states, wherein the first plurality of TCI states indicates the plurality of source reference signals, and wherein the first plurality of TCI states are of a first set of TCI states, and wherein the first set of TCI states are for downlink (DL) communication.

13. The UE of claim 10, wherein the plurality of target channel elements or the plurality of target reference signals use the QCL information or the spatial filter information from a reference signal.

14. A network controller comprising:

a non-transitory memory storage storing instructions; and one or more processors in communication with the non-transitory memory storage, wherein the one or more processors execute the instructions to cause the network controller to perform operations including:

transmitting, to a communication device, a first control message comprising a first indication information indicating a plurality of target channel elements or a plurality of target reference signals; and transmitting, to the communication device, a second control message comprising second indication information indicating a plurality of source reference signals, wherein the plurality of source reference signals instructs the communication device to determine quasi co-location (QCL) information or spatial filter information in accordance with the plurality of source reference signals, and wherein the QCL information or the spatial filter information is used for receiving or transmitting the plurality of target reference signals or in the plurality of target channel elements.

15. The network controller of claim 14, wherein the transmitting the second control message is after the transmitting the first control message, wherein the first control message is a radio resource control (RRC) signaling, and wherein the second control message is a downlink control information (DCI) message.

16. The network controller of claim 14, wherein the second indication information comprises a first plurality of TCI state indicators indicating a first plurality of transmission configuration indication (TCI) states, wherein the first plurality of TCI states indicates the plurality of source reference signals, and wherein the first plurality of TCI states are of a first set of TCI states, and wherein the first set of TCI states are for downlink (DL) communication.

17. The network controller of claim 14, wherein the plurality of target channel elements or the plurality of target reference signals use the QCL information or the spatial filter information from a reference signal.

* * * * *